US009194735B2

(12) United States Patent
Tamai et al.

(10) Patent No.: US 9,194,735 B2
(45) Date of Patent: Nov. 24, 2015

(54) COMBINATION WEIGHING DEVICE INITIALIZATION

(71) Applicant: ISHIDA CO., LTD., Kyoto-shi, Kyoto (JP)

(72) Inventors: Yutaka Tamai, Ritto (JP); Toru Hiratsuka, Ritto (JP); Mikio Kishikawa, Ritto (JP); Toshikazu Shotsu, Ritto (JP); Hideshi Miyamoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 14/384,357

(22) PCT Filed: Feb. 28, 2013

(86) PCT No.: PCT/JP2013/055474
§ 371 (c)(1),
(2) Date: Sep. 10, 2014

(87) PCT Pub. No.: WO2013/137008
PCT Pub. Date: Sep. 19, 2013

(65) Prior Publication Data
US 2015/0129323 A1    May 14, 2015

(30) Foreign Application Priority Data

Mar. 16, 2012   (JP) .................................. 2012-061064
Jun. 4, 2012    (JP) .................................. 2012-127591

(51) Int. Cl.
*G01G 19/387*    (2006.01)
*B65G 27/32*     (2006.01)
*G01G 19/393*    (2006.01)

(52) U.S. Cl.
CPC .............. *G01G 19/393* (2013.01); *B65G 27/32* (2013.01)

(58) Field of Classification Search
CPC ..... B65G 27/32; G01G 19/387; G01G 19/393
See application file for complete search history.

(56) References Cited

U.S. PATENT DOCUMENTS

| 4,108,363 | A | * | 8/1978 | Susumu ..................... 235/383 |
| 4,379,495 | A | * | 4/1983 | Cocks et al. ..................... 177/1 |
| 4,397,364 | A | * | 8/1983 | Hirano .................... 177/25.18 |
| 4,398,612 | A | * | 8/1983 | Mikami et al. ............. 177/25.18 |
| 4,534,428 | A | * | 8/1985 | Mosher et al. ................... 177/1 |

(Continued)

FOREIGN PATENT DOCUMENTS

| JP | S62-280625 A | 12/1987 |
| JP | 2001-317988 A | 11/2001 |

(Continued)

*Primary Examiner* — Randy W Gibson
(74) *Attorney, Agent, or Firm* — Global IP Counselors, LLP

(57) ABSTRACT

A combination weighing device facilitates the performance of operation using optimal operational settings. The combination weighing device includes a dispersion feeder, a plurality of radial feeders and a plurality of weighing hoppers. The dispersion feeder is disposed in an upper portion, and conveys and disperses supplied articles. The radial feeders are arranged radially on the periphery of the dispersion feeder, and convey the articles that are discharged from the dispersion feeder. The weighing hoppers receive the articles discharged from the radial feeders. The combination weighing device performs a combination weighing based on the weight of the articles in the weighing hoppers. In the combination weighing device, the operational settings are performed automatically.

19 Claims, 11 Drawing Sheets

(56) References Cited

U.S. PATENT DOCUMENTS

| | | | |
|---|---|---|---|
| 4,615,403 A * | 10/1986 | Nakamura | 177/25.18 |
| 4,708,215 A * | 11/1987 | Nakamura et al. | 177/25.18 |
| 4,782,904 A * | 11/1988 | Brock | 177/185 |
| 4,817,026 A | 3/1989 | Inoue et al. | |
| 4,951,763 A * | 8/1990 | Zimmerman et al. | 177/164 |
| 5,074,436 A * | 12/1991 | Inoue | 222/56 |
| 5,130,938 A * | 7/1992 | Inoue | 702/194 |
| 5,270,495 A * | 12/1993 | Mosher et al. | 177/25.18 |
| 5,308,930 A * | 5/1994 | Tokutu et al. | 177/25.13 |
| 5,392,898 A * | 2/1995 | Burgess et al. | 198/750.8 |
| 5,753,866 A * | 5/1998 | Ikeda et al. | 177/25.18 |
| 5,756,939 A * | 5/1998 | Taniguchi | 177/25.18 |
| 6,034,334 A * | 3/2000 | Nakamura et al. | 177/25.18 |
| 6,271,484 B1 * | 8/2001 | Tokutsu | 177/25.18 |
| 6,545,230 B2 * | 4/2003 | Tamai et al. | 177/25.18 |
| 7,002,082 B2 * | 2/2006 | Kageyama et al. | 177/25.18 |
| 7,064,281 B2 * | 6/2006 | Kageyama et al. | 177/25.18 |
| 2015/0021103 A1 * | 1/2015 | Tamai et al. | 177/25.18 |

FOREIGN PATENT DOCUMENTS

| | | |
|---|---|---|
| JP | 2001-343294 A | 12/2001 |
| JP | 2003-004517 A | 1/2003 |
| JP | 2004-191234 A | 7/2004 |
| JP | 2008-216028 A | 9/2008 |
| JP | 4145399 B | 9/2008 |
| JP | 2009-008400 A | 1/2009 |
| JP | 2011-145106 A | 7/2011 |

* cited by examiner

| FILTER NUMBER | STAGE NUMBER | | |
|---|---|---|---|
| | 1 | 2 | 3 |
| DF1 | 200 | 400 | 800 |
| DF2 | 250 | 500 | 1000 |
| DF3 | 300 | 600 | 1200 |
| DF4 | 350 | 700 | 1400 |
| DF5 | 400 | 800 | 1600 |

FIG. 11

| FILTER NUMBER | STAGE NUMBER | | |
|---|---|---|---|
| | 1 | 2 | 3 |
| DF1 | 0.05 | 0.03 | 0.01 |
| DF2 | 0.04 | 0.02 | 0.01 |
| DF3 | 0.03 | 0.02 | 0.01 |
| DF4 | 0.02 | 0.01 | 0.005 |
| DF5 | 0.01 | 0.01 | 0.005 |

FIG. 12

COMBINATION WEIGHING DEVICE INITIALIZATION

TECHNICAL FIELD

The present invention relates to a combination weighing device.

BACKGROUND ART

In a combination weighing device, operational settings for the combination weighing device are performed according to the operational conditions, the characteristics of the object to be subjected to combination weighing, or the like.

Typically, these operational settings are performed based on the experience or intuition of an operator who operates the combination weighing device, or are performed by repetitive trial and error in test operations or the like.

SUMMARY OF THE INVENTION

Technical Problem

However, when operational settings are performed based on the experience or intuition of an operator, optimal operational settings may not be performed properly depending on the ability of the operator. Furthermore, when operational settings are performed based on test operations or the like, in the case that the operational conditions are changed, the combination weighing device may be stopped for a long period of time in order to perform the operational settings.

The problem of the present invention is to provide a combination weighing device that facilitates the operation using optimal operational settings.

Solution to Problem

A combination weighing device according to the present invention includes a dispersion feeder, a plurality of radial feeders and a plurality of weighing hoppers. The dispersion feeder is disposed in an upper portion, and conveys and disperses supplied articles. The radial feeders are arranged radially on the periphery of the dispersion feeder, and convey the articles discharged from the dispersion feeder. The weighing hoppers receive the articles discharged from the radial feeders. The combination weighing device performs a combination weighing based on the weight of the articles in the weighing hoppers. In the combination weighing device, the operational settings are performed automatically.

In this manner, operational settings for the combination weighing device can be performed in a short time period without depending on the ability of an operator.

A conventional combination weighing device being circular in plan view is provided with a dispersing and supplying equipment A, which arranges a dispersion feeder DF having a conical vibrating plate VP on an upper central portion of the device and a plurality of radial feeders RF radially around the dispersion feeder to surround the periphery of the dispersion feeder as illustrated by the partial sectional figure in FIG. 8, and is configured to disperse articles G supplied onto the dispersion feeder DF to the connected radial feeders RF and discharge the articles G little by little from the distal end of each of the radial feeders RF to each of hoppers PH in a lower stage.

In the dispersing and supplying equipment A, the weight of articles supplied to each hopper PH is detected at a lower stage weighing hopper WH in order to stabilize the supply amount of articles to the respective hoppers PH and WH, and based on the detected weight, the vibration strength and the vibration time of each radial feeder RF are adjusted manually or automatically so that the discharge amount from the corresponding radial feeder RF coincides with an ideal discharge weight. In this context, the ideal discharge weight is a value obtained by dividing the combination target weight by the ideal combination selected hopper number. Furthermore, a weight detector S is provided to the dispersion feeder DF, which is located in the center, to detect the load weight of articles supplied onto the dispersion feeder DF, and articles G are constantly retained on the dispersion feeder DF within the predetermined weight range by performing on/off control of an upper stage dross feeder CF, which discharges articles, based on the detected weight. Furthermore, the discharge amount for each discharge from the dispersion feeder DF is controlled to coincide with a combination target weight by adjusting the vibration strength and the vibration time of the dispersion feeder DF manually or automatically.

However, when new articles that have not been handled previously are weighed, the initial values of the load amount of articles on the dispersion feeder DF and the initial values of the vibration strength and vibration time of each of the feeders DF, RF are set according to experience or intuition since the appropriate values to enable a shift to stable supply are unknown.

When the discharge amount from the dispersion feeder DF to the radial feeders RF becomes insufficient after starting the operation, the load amount set for the dispersion feeder DF is raised and/or the vibration strength of the dispersion feeder DF is raised. Conversely, when the discharge amount from the dispersion feeder DF to the radial feeders RF is excessive, the overflow of articles G from the dispersion feeder DF is piled up on the start end portion SP of the radial feeders RF, and the pile is conveyed without being collapsed and supplied to the hoppers PH, WH. When the supply amount is excess or insufficient, combination failures tend to occur, and the operating ratio of the device falls. In particular, when the supply to a weighing hopper WH is excessive, the probability that the weighing hopper WH is selected in the combination is reduced, and the accuracy of the weighing device is reduced. In addition, the radial feeders RF corresponding to the hoppers WH that are not selected in the combination stay in a state of not being driven, and therefore, more articles G are piled up at the start end portion SP of the radial feeders RF and the situation become worse.

Inventions such as those disclosed in Patent Literature 1 (Japanese Patent No. 4145399) and Patent Literature 2 (Japanese Patent Application Laid-Open No. 2001-317988) are proposed to improve the situation in which the initial values are determined by experience or intuition when new articles that have not been handled previously are supplied to the dispersing and supplying equipment A.

However, in these conventional techniques, a control system controlling the upstream dispersion feeder DF and a control system controlling the downstream radial feeders RF are independent to each other, and therefore, when the initial value for one of the control systems is inadequate, it is not possible to compensate that inadequacy by the other control system. As a result, the problem arises that trial and error needs to be repeated for identifying an optimal condition until respective controls of the feeders DF and RF become stabilized.

Accordingly, in a combination weighing device, it is preferable that a characteristic of whether the articles are easy to convey or difficult to convey and an ideal layer thickness of the articles while being conveyed are introduced, the optimal initial values as the setting of the dispersion feeder and the radial feeders are obtained, and each of the feeders is driven based on the obtained initial values so as to improve the start-up characteristics until both control systems are stabilized.

In this context, the combination weighing device of the present invention preferably further includes a setting unit, a dispersion control system, and a radial control system. The setting unit preferably sets a combination target weight. The dispersion control system preferably adjusts a drive parameter for the dispersion feeder so that a discharge amount on each discharge from the dispersion feeder to radial feeders coincides with the combination target weight. The radial control system preferably adjusts the drive parameter for each radial feeder so that a discharge amount on each discharge from a plurality of radial feeders selected in the combination coincides with the combination target weight. The combination weighing device preferably calculates the drive parameter for the radial feeders and the drive parameter for the dispersion feeder based on layer thickness parameters related to respective layer thicknesses of the articles on the dispersion feeder and the articles on the radial feeders, and speed parameters respectively for the dispersion feeder and the radial feeders. The layer thickness parameters related to the respective layer thicknesses of the articles on the dispersion feeder and the articles on the radial feeders are preferably specified by designating whether a layer thickness of the articles is large or small when the respective discharge amounts respectively discharged from both of the control systems at each discharge are balanced. The speed parameters respectively for the dispersion feeder and the radial feeders are preferably specified by designating whether articles are easy to convey or difficult to convey. Preferably, each of the calculated drive parameters is respectively set as an initial value for the corresponding control system.

In this context, the drive parameter that is set as an initial value for the dispersion feeder denotes the load amount of articles loaded onto the dispersion feeder, and either the vibration strength or vibration time for driving the dispersion feeder or both the vibration strength and vibration time for driving the dispersion feeder. The drive parameter that is set as an initial value for the radial feeders denotes either the vibration strength or vibration time for driving the radial feeders or both of them.

Furthermore, an adjustment to the drive parameters includes a case in which the parameters are manually changed while referring the drive parameter that is displayed on the display screen and a case in which the parameter is automatically adjusted. Automatic adjustment for the dispersion feeder is performed when the supply to the plurality of weighing hoppers becomes insufficient or excessive and the load amount on the dispersion feeder is increased or decreased in a stepwise manner in response to the supply state, or the vibration time and the vibration strength of the dispersion feeder is automatically changed in response to the variation of the load amount. Furthermore, adjustment with feedback control of the vibration time and the vibration strength of each radial feeder is performed as automatic adjustment for the radial feeder so that the average weight of articles that are weighed in the weighing hoppers coincides with a value obtained by dividing a combination target weight by an ideal combination selected hopper number.

The solution principle of the present invention will be described below with reference to FIG. 1 to FIG. 3.

Articles that are the object of weighing have various characteristics such as being easy to convey, being difficult to convey, being easy to collapse in a piled up state, being resistant to collapse in a piled up state, or the like. The stability states when such articles are supplied by a dispersing supply apparatus may be roughly divided into a state illustrated in FIG. 1 and a state illustrated in FIG. 2.

The state illustrated in FIG. 1 is a state in which the layers of articles G on the radial feeders RF and the dispersion feeder DF are thin and flow as substantially uniform layers. In this state, the layer on the dispersion feeder DF and the layer on the radial feeders RF are divided and forms a step at the boundary between the feeders.

The state illustrated in FIG. 2 is a state in which the layers of articles G on the radial feeder RF and the dispersion feeder DF are thick and flow as substantially uniform layers, and the layer on the radial feeders RF and the layer on the dispersion feeder DF are connected.

In the state illustrated in FIG. 1, articles G discharged from the dispersion feeder DF flow onto all of the radial feeders RF. In the state illustrated in FIG. 2, articles G mainly flow onto the driven radial feeders RF in which articles G are flowing since the articles on the undriven radial feeders RF act as obstacles. In this context, such a stable state in which the discharge amount from the dispersion feeder DF and the discharge amount from the radial feeders RF are in balance will be expressed with the combination target weight set to the device, the operating speed (times/min), the layer thickness parameter specified by the difference in the layer thicknesses of articles in a stable state, and a speed parameter specified by designating whether the article is easy to convey or difficult to convey.

Firstly, in both of the states of FIG. 1 and FIG. 2, an average load amount (g) of articles loaded onto the dispersion feeder DF while being in a stable supply state is expressed as:

$$\text{Load amount} = \text{Weight per unit area} \times \text{Area of dispersion feeder } DF \qquad (1)$$

When the dispersion feeder DF has a conical vibrating plate VP for example, the weight per unit area (g/mm$^2$) is pressure applied to the vibrating plate VP by articles stacked thereon as indicated by the column shown by the dot-and-dash line in FIG. 3 and the area of the dispersion feeder DF is given by $\pi R^2$ when R is the radius of the vibrating plate VP.

If it is assumed that the discharge amount on each discharge from the outer periphery of the dispersion feeder DF is substantially constant, the discharge amount on each discharge from the dispersion feeder DF in the state illustrated in FIG. 1 is expressed as:

$$\text{Each discharge amount} = \text{Weight per unit area} \times \text{Outer peripheral length} \times \text{Moving speed} \times \text{Moving time} \qquad (2)$$

The outer peripheral length of the dispersion feeder DF is given by $2\pi R$. Furthermore, the moving speed is the speed in a radial direction at which articles emerges from the outer periphery. Therefore, when the terms for the weight per unit area are cancelled from Equations (1) and (2), Equation (2) is expressed as:

$$\text{Each discharge amount} = (2/R) \times \text{Moving speed} \times \text{Moving time} \times \text{Load amount} \qquad (3)$$

In this context, in a stable state, each discharge amount discharged from the dispersion feeder DF is the combination target weight that is discharged by the selected combination. Furthermore, the moving speed of articles discharged from the dispersion feeder DF may be treated as being proportional to the vibration strength of the dispersion feeder DF, and therefore it may be assumed that:

$$\text{Moving speed} = \text{Speed parameter} \times \text{Vibration strength} \qquad (4)$$

The speed parameter expresses the degree in which the moving speed is increased by increasing the vibration strength of the dispersion feeder DF by one step, and it is mainly affected whether the articles are easy to convey or difficult to convey. The moving time is the vibration time of the dispersion feeder DF, and therefore when Equation (4) is substituted into Equation (3), it is expressed that:

Combination target weight=(2/R)×Speed parameter× Vibration strength×Vibration time×Load amount  (5)

When Equation (5) is rewritten to express the vibration strength, it becomes:

Vibration strength=(R×Combination target weight)/ (2×Speed parameter×Vibration time×Load amount)  (6)

The radius R is known from the shape of the vibrating plate VP. The speed parameter differs depending on whether the articles are easy to convey or difficult to convey. Therefore, the speed parameter for articles that are easy to convey is obtained based on the relationship between the moving speed and the vibration strength acquired when a representative article that is easy to convey is conveyed on the dispersion feeder DF in an experiment. The speed parameter for articles that are difficult to convey is obtained based on the relationship between the moving speed and the vibration strength acquired when a representative article that is difficult to convey is conveyed on the dispersion feeder DF in an experiment.

However, the speed parameter obtained herein is that for the state illustrated in FIG. 1. The speed parameter for the state illustrated in FIG. 2 differs from the speed parameter for the state illustrated in FIG. 1 since the articles flow only to the driven radial feeders RF that are selected in the combination in the state illustrated in FIG. 2, and is also obtained in an experiment. Furthermore, since the vibration time in Equation (6) is restricted by the operating speed setting and an allowable vibration time is obtained within that range, the only unknown in Equation (6) above is the load amount of articles on the dispersion feeder DF.

The load amount is given by (the weight per unit area×the area of the dispersion feeder DF), and in order to express this value with the combination target weight and the operating speed (times/min), the required discharge amount (g/sec) that is discharged from the dispersion feeder DF per unit time is given by:

Required discharge amount=Combination target weight×Operating speed/60  (7)

The weight per unit area is expressed by a linear expression as shown below by using the required discharge amount. When the required discharge amount becomes larger, the discharge amount from the dispersion feeder DF increases and thereby the load amount needs to be increased in response. In this context, the weight per unit area is considered to be proportional to the required discharge amount and is expressed by the following linear expression:

Weight per unit area=(Adf×Required discharge amount)+Bdf  (8)

The coefficients Adf, Bdf used in this equation are layer thickness parameters that are specified with the difference in the layer thickness while conveying articles. These parameters can also be obtained respectively in experiments with reference to the layer thickness in the ideal state in FIG. 1 and the layer thickness in the ideal state in FIG. 2. In this manner, the load amount that was unknown may be expressed as:

Load amount=πR²×{(Adf×Required discharge amount)+Bdf}

The load amount can be calculated by substituting the combination target weight, the operating speed, and the layer thickness parameters specified by the difference whether the layer thickness is large or small. Furthermore, the vibration strength of the dispersion feeder DF in Equation (6) is calculated with that value.

Next, regarding the radial feeders RF, the average load amount (g) of articles that are loaded onto all of the radial feeders RF in a stable supply state is given by:

Total load amount=Weight per unit area×Conveying area of each radial feeder×Total number of radial feeders  (9)

Here, the conveying area of each radial feeder is the area of the average conveying surface when articles are conveyed by each radial feeder RF. Therefore, the each discharge amount from the radial feeders RF selected in the combination is the discharge amount from the outlet of the conveying surface, and is given by:

Each discharge amount=Weight per unit area×Outlet breadth of radial feeder×Moving speed×Moving time×Number of combination selected radial feeders  (10)

Therefore, when the terms for weight per unit area are cancelled from Equations (9) and (10), Equation (10) becomes:

Each discharge amount=Number of selected radial feeders×Outlet breadth×Moving speed×Moving time×Load amount/(Conveying area of each radial feeder×Total number of radial feeders)  (11)

In a stable state, each discharge amount from the radial feeders RF selected in the combination is the combination target weight. Furthermore, since the moving speed of articles discharged from the radial feeders RF is approximately proportional to the vibration strength of the radial feeders RF, it is expressed as:

Moving speed=Speed parameter×Vibration strength

Since the moving time is the vibration time of the radial feeders RF, Equation (11) becomes:

Combination target weight=Number of selected radial feeders×Outlet breadth×Speed parameter×Vibration strength×Vibration time×Load amount/(Conveying area of each radial feeder×Total number of radial feeders)  (12)

When Equation (12) is rewritten to express the vibration strength, it becomes:

Vibration strength=Combination target weight×Conveying area of each radial feeder×Total number of radial feeders/(Number of selected radial feeders×Outlet breadth×Speed parameter×Vibration time×Load amount)  (13)

The conveying area of the radial feeders RF, the total number of radial feeders, and the outlet breadth are known from the shape of the radial feeders RF. The speed parameters can be obtained, as discussed above, based on the relationship between the moving speed and the vibration strength acquired when articles that are easy to convey and articles that are difficult to convey are respectively conveyed on the radial feeders RF in experiments. The vibration time in Equation (13) is restricted by the operating speed and an allowable vibration time is determined within that range, the unknowns in Equation (13) are the number of selected radial feeders and the load amount.

The number of selected radial feeders is predetermined according to the number of weighing hoppers WH that are provided in the device. For example, in a device having ten weighing hoppers WH, five weighing hoppers becomes the number of selected hoppers, and in a case that the device has equal to or more than fourteen weighing hoppers WH, the number of selected hopper becomes 3.8 since the weighing hoppers WH selected in the previous occasion are excluded from the combination and the combination is selected from the remaining weighing hoppers. Therefore, the unknown in Equation (13) is only the load amount of the articles on all of the radial feeders RF.

The total load amount can be expressed from Equation (9) as:

Load amount on all radial feeders=Weight per unit area×Conveying area×Total number of radial feeders The weight per unit area of the radial feeders RF depends on the layer thickness of the articles on the radial feeders RF in both the states illustrated in FIG. 1 and FIG. 2, and therefore, when the layer thickness parameter in each state is denoted as Brf, the load amount on all the radial feeders can be expressed as Load amount on all radial feeders=$Brf$×Conveying area×Total number of radial feeders However, the layer thickness parameters Brf for the state in FIG. 1 and for the state in FIG. 2 are different to each other, and therefore, the layer thickness parameter for the respective states is obtained by experiments in advance. In this manner, the load amount on all the radial feeders that was an unknown can be calculated by inputting the obtained layer thickness parameter, the conveying area of each of the radial feeders RF, and the total number of radial feeders. Furthermore, the vibration strength of the radial feeders RF in Equation (13) can be calculated based on the calculated load amount. Although the required discharge amount in Equation (7) is used in order to calculate the layer thickness parameters in relation to the dispersion feeder DF, the required discharge amount in Equation (7) is not used in relation to the radial feeders RF since the layer thickness of the articles G on the radial feeders RF is determined by the step between the radial feeders RF and the dispersion feeder DF and/or the dimensions and the shape or the like of the article.

In light of the above discussion, the load amount (g), the vibration strength, the vibration time that are set as initial values for the dispersion feeder DF and the vibration strength and the vibration time that are set as initial values for the radial feeders RF can be calculated with the combination target weight, the operating speed, the speed parameters, and the layer thickness parameters.

As expressed herein, the drive parameters set to the dispersion feeder and the radial feeders can be easily set automatically by merely designating whether the layer thickness of the articles in a stable supply state is large or small and the difference whether the articles are easy to convey or difficult to convey. Therefore, the device can be handled easily by an unexperienced user without depending on experienced operator.

Also, the layer thickness parameters related to the layer thickness of the articles respectively for the dispersion feeder and the radial feeder which are specified by designating whether the thickness of article layer is large or small and the speed parameters respectively for the dispersion feeder and the radial feeders which are specified by designating whether the articles are easy to convey or difficult to convey are used in order to calculate the drive parameter for the dispersion feeder and the drive parameter for the radial feeders. The start-up characteristics until both control systems are stabilized are improved and thereby the operating ratio during operation startup can be enhanced since the dispersion feeder and the radial feeders are driven with each of the calculated drive parameters.

Furthermore, it is possible to sufficiently cope with a change in the operational conditions setting since the drive parameter related to the combination target weight and the operating speed changes in response to a change in the combination target weight and the operating speed. In addition, since the speed parameter is specified by designating whether the articles are easy to convey or difficult to convey, it is possible to sufficiently cope with a change in the conveying characteristics due to degree of dryness and wetness of the articles.

Incidentally, the weighing signal that is output by the weighing unit of the combination weighing device includes various types of noise such as noise caused by vibration generated when supplying the articles to the weighing hopper. In this regard, a digital filter may be provided in the filter processing of the combination weighing device to remove noise from the output weighing signal. For example, Patent Literature 3 (Japanese Patent Application Laid-Open No. 2003-4517) discloses an example of provision of a digital filter in the combination weighing device.

The digital filter used in Patent Literature 3 (Japanese Patent Application Laid-Open No. 2003-4517) is a single stage digital filter having a fixed filter time (required processing time) and a fixed damping effect. In contrast, there are multistage digital filters that enhance the noise damping effect by executing processing of the weighing signal using a plurality of staged filters over an elapsed time (for example, Patent Literature 4 (Japanese Patent Application Laid-Open No. 62-280625)). In a multistage digital filter, although the required processing time increases when filter processing of the weighing signal is performed by use of a staged filter with a large stage number, a high noise damping effect is achieved.

In the combination weighing device, there are weighing units that are not selected in the combination during the combination calculation, and therefore, when using a multistage digital filter, there is a further reduction in noise in the weighing signal from the weighing unit that has a long retention time (time until the weighing unit is selected as part of a combination in the combination calculation after articles are supplied therein), and thereby a reduction in a weighing error can be expected as the overall combination weighing device.

However, it is difficult to comprehend the performance of a multistage digital filter (expected error value) since the damping effect in the multistage digital filter changes as time elapses. In particular, in a combination weighing device that has a plurality of multistage digital filters, there is a difficulty to comprehend the performances of the multistage digital filters and select an optimal multistage digital filter.

For example, it is assumed that a combination weighing device has a plurality of multistage digital filters and each of them has a different filter characteristic (different required processing time and damping effect). In this state, it is assumed to examine which multistage digital filter makes it possible to perform a weighing with the least error.

Firstly, it needs to examine the staged filter of which stage number can be used in each multistage digital filter at the timing of the combination weighing, but it cannot be uniquely determined since the required processing time differs for each multistage digital filter and each stage number and some weighing units are not selected in the combination when performing a combination weighing. Furthermore, a comparison of the damping effect of multistage digital filters is complex since the damping effect of each multistage digital filter differs depending on which stage number of the staged filter is used. In addition, when a parameter such as an operating speed (a number of combination calculations executed per unit time) is changed, the available stage number of the staged filter at the timing of the combination weighing may be changed.

Consequently, under the circumstances, an optimal multistage digital filter is selected on the basis of an actual test operation of the combination weighing device depending on the operating condition, and when a parameter such as the operating speed or the like changes, further work is required to reselect the multistage digital filter.

Therefore, when a filter processing is performed to a weighing signal of the weighing unit with a multistage digital filter, it is preferred that the combination weighing device is configured to facilitate evaluation of the multistage digital filter and to perform operating settings that enable use of weighing signals applied an optimal filter processing.

In this context, the combination weighing device according to the present invention preferably further has a plurality of weighing units, a plurality of multistage digital filters, a combination calculating unit, a first calculating unit, a derivation unit, a second calculating unit, a third calculating unit, and a selecting unit. Preferably, the weighing units are provided respectively to the weighing hoppers, weigh the articles that are received by each of the weighing hoppers, and output a weighing signal as a weighing result. The multistage digital filter includes a plurality of staged filters, and preferably performs filter processing of the weighing signals by using the staged filter of a stage number that corresponds to a time after the weighing hopper receives the articles. The combination calculating unit preferably selects a combination of the weighing hoppers based on a combination calculation using the weighing signal and performs a combination weighing. The first calculating unit preferably calculates an available filter processing time by using an operating speed. The derivation unit preferably compares the available filter processing time with the required processing time for each of the staged filters, and derives the stage number of the staged filter that will finish the filter processing before an end of the available filter processing time as an available stage number of processing for each of the multistage digital filters. The second calculating unit preferably calculates an individual error expected value respectively for the weighing units for each of the multistage digital filters based on the available stage number of processing, a selection head number that is a number of the weighing hoppers selected in the combination calculation, a stable head number that is a number of the weighing hoppers selectable in the combination calculation, and error information for the respective staged filters. The third calculating unit preferably calculates a total error expected value with respect to the total weight of articles after the combination weighing for each of the multistage digital filters based on the individual error expected values. The selecting unit preferably selects one of the multistage digital filters based on the total error expected value. The combination calculating unit preferably performs the combination calculation using the weighing signal to which filter processing is performed by the multistage digital filter selected by the selecting unit.

In this context, the operating speed is the number of operations of the combination calculation (combination weighing) executed per unit time by the combination weighing device. The operating speed for example, is expressed in units of times/min. The available filter processing time is the time which the multistage digital filter can use for filter processing before a combination calculation is executed.

In this context, the individual error expected values of the respective weighing units are calculated according to the operating speed for a case when a given multistage digital filter is used, and furthermore, the total error expected value with respect to the total weight of articles after the combination weighing is calculated based on the individual error expected values. That is to say, in relation to a given multistage digital filter, the evaluation of the multistage digital filter at a given operating speed can be easily performed. As a result, it is possible to comprehend whether or not there is a multistage digital filter that satisfies the error standard expected by a user at the operating speed. Furthermore, when there are a plurality of multistage digital filters available, it is possible to easily compare the multistage digital filters. Then, combination weighing with the optimal selected multistage digital filter can be realized since one of the multistage digital filters is selected as the operating setting based on the total error expected value.

Alternatively, the combination weighing device according to the present invention further has a plurality of weighing units, a plurality of multistage digital filters, a combination calculating unit, a first calculating unit, a derivation unit, a second calculating unit, a third calculating unit and a filter generating unit. Preferably, the weighing units are provided respectively to the weighing hoppers, weighs the articles that are received by each of the weighing hoppers, and outputs a weighing signal as a weighing result. The multistage digital filter includes a plurality of staged filters, and preferably performs filter processing of the weighing signals by using the staged filter of a stage number that corresponds to the time after the weighing hopper receives the articles. The combination calculating unit preferably selects a combination of weighing hoppers based on a combination calculation using the weighing signal and performs the combination weighing. The first calculating unit preferably calculates an available filter processing time at a time of the combination weighing in relation to a plurality of cycles by using the operating speed. The derivation unit preferably compares the available filter processing time with the required processing time for each of the staged filters, and derives the stage number of the staged filter that will finish the filter processing before the end of the available filter processing time as an available stage number of processing for each of the multistage digital filters and for each of the cycles. The second calculating unit preferably calculates an individual error expected value respectively for the weighing units for each of the multistage digital filters and for each of the cycles based on the available stage number of processing, a selection head number that is a number of the weighing hoppers selected in the combination calculation, a stable head number that is a number of the weighing hopper selectable in the combination calculation, and error information for the respective staged filters. The third calculating unit preferably calculates a total error expected value with respect to the total weight of articles after the combination weighing for each of the multistage digital filters and for each of the cycles based on the individual error expected values. The filter generating unit preferably combines the staged filters for each of the cycles based on the total error expected values and thereby generates a filter. The combination calculating unit preferably performs a combination calculation using the weighing signal to which filter processing is performed by the filter generated by the filter generating unit.

In this context, an optimal filter is generated as the operating setting by combining the multistage digital filter having the minimum total error expected value for each of the cycles. As a result, it is possible to constantly perform a combination weighing with weighing signals to which optimal filter processing is performed.

Furthermore, preferably, the combination weighing device according to the present invention further has an acquisition unit configured to acquire at least one of the selection head number and the stable head number during operation.

In this context, a more accurate total error expected value can be calculated since the total error expected value is calculated based on the measured stable head number and/or selection head number. That is to say, the multistage digital filters can be more accurately evaluated.

In addition, preferably, the combination weighing device according to the present invention further has an output unit configured to output the total error expected value.

In this manner, a user of the combination weighing device can directly comprehend the quantitative evaluation of the multistage digital filters. Furthermore, the user can easily comprehend the conditions of combination weighing which satisfy the error standard required by the user.

In addition, preferably, the combination weighing device according to the present invention further has a plurality of pool hoppers. Preferably, the pool hoppers are provided to the respective weighing hoppers, store articles discharged from the radial feeders temporarily and supply the articles to the weighing hoppers. The first calculating unit preferably calculates the available filter processing time based on the operating speed, a delay time from opening of the weighing hopper to opening of the pool hopper, and a stabilizing time from opening of the pool hopper to starting of acquisition of the weighing signal by the weighing unit.

In this manner, even when the delay time or stabilizing time changes due to the change of the type of articles or the change of the amount of articles supplied to the weighing hoppers, the available filter processing time corresponding to those conditions can be calculated. As a result, an accurate evaluation of the multistage digital filters can be performed.

Preferably, the combination weighing device according to the present invention further has an input unit configured to be input the operating speed.

In this manner, even when it is necessary to change the operating speed, each multistage digital filter can be easily evaluated. As a result, even when the operating speed changes, it is easy to operate the combination weighing device more accurately with optimal operating settings.

<Advantageous Effects of Invention>

The combination weighing device according to the present invention enables operating settings for the combination weighing to be set in a short time period without depending on the ability of an operator.

BRIEF DESCRIPTION OF THE DRAWINGS

FIG. 11 illustrates an example of a table showing required processing times of filter processing for each stage number of the staged filter in multistage digital filters. The unit of the numerical values in the table is millisecond (msec).

FIG. 12 illustrates an example of a table showing the error expected values for each stage number of the staged filter in multistage digital filters. The unit of the numerical values in the table is gram (g).

DESCRIPTION OF EMBODIMENTS

First Embodiment

A combination weighing device 100 according to a first embodiment of the present invention will be described below with reference to the figures.

Figure 1:
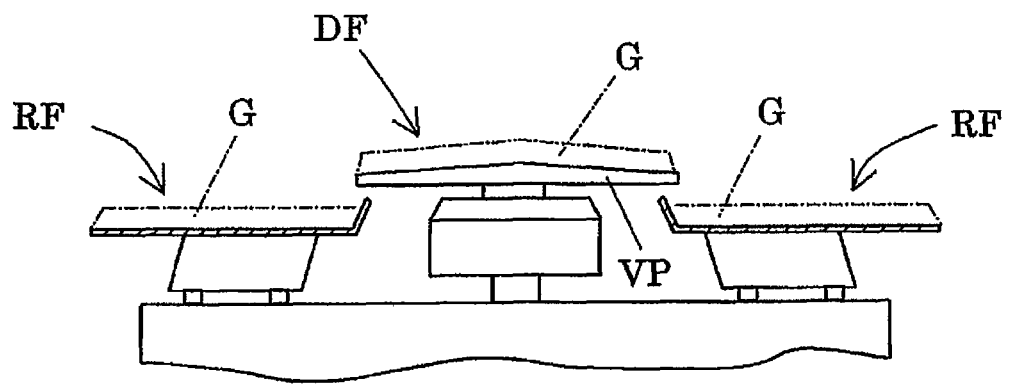
FIG. 1 is a partial sectional view illustrating stacking state of articles when supply of articles is stable in a combination weighing device according to a first embodiment of the present invention.
Figure 2:
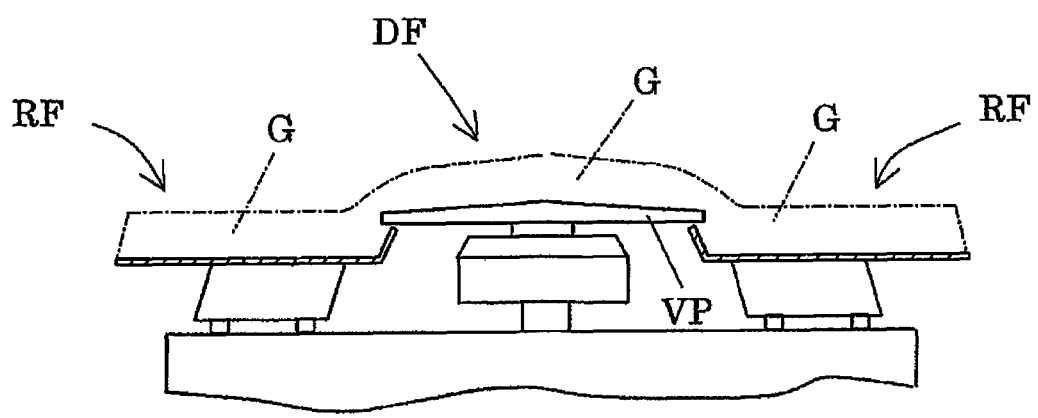
FIG. 2 is a partial sectional view illustrating another stacking state when supply of articles is stable in the combination weighing device according to the first embodiment of the present invention.
Figure 3:
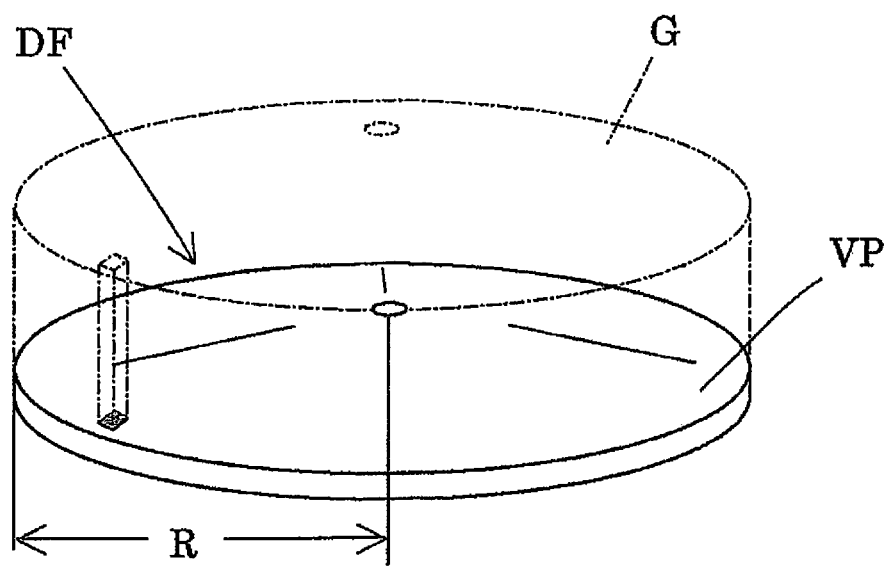
FIG. 3 is a perspective view illustrating a state in which articles are stacked on a dispersion feeder in the combination weighing device according to the first embodiment of the present invention.
Figure 4:
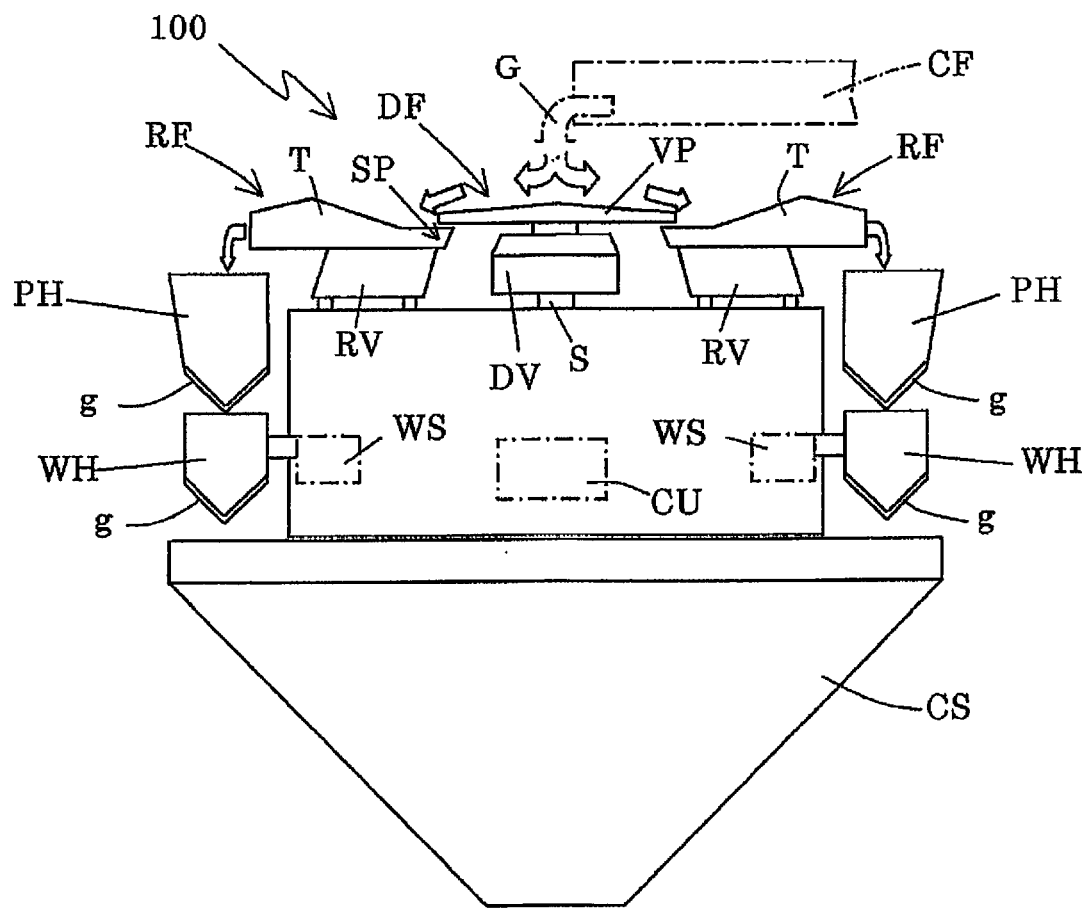
FIG. 4 is a partial side view of the combination weighing device according to the first embodiment of the present invention.

FIG. 4 is a schematic view of the main part of a combination weighing device 100 according to the first embodiment of the present invention. In the figure, the combination weighing device 100 includes a dispersion feeder DF in the upper central portion of the device, a plurality of radial feeders RF arranged radially around the dispersion feeder DF to surround the dispersion feeder, a plurality of pool hoppers PH respectively arranged in the lower stage of each radial feeder RF, the same number of weighing hoppers WH arranged below the pool hoppers PH, and an collection chute CS disposed below the weighing hoppers WH.

The dispersion feeder DF disperses articles G supplied onto a vibrating plate VP in a peripheral direction by helical and vertical oscillating movements of the conical shaped vibrating plate VP mounted on a moveable portion of an electromagnetic feeder DV. Furthermore, a weight sensor S is mounted on the dispersion feeder DF, and the weight of the articles G supplied onto the vibrating plate VP is detected by the weight sensor S and the detected weight is input to a control unit CU described below. Furthermore, a cross feeder CF is provided above the dispersion feeder DF, and on/off control of the cross feeder CF is performed based on the detected weight of the weight sensor S so that the articles G within a predetermined weight range are constantly retained on the vibrating plate VP.

The radial feeder RF conveys the articles G on a trough T in a forward direction by an oscillating movement, in a longitudinal direction, of the trough T mounted on a movable portion of the electromagnetic feeder RV, and thereby discharges the articles G from a distal portion of the trough T onto the pool hopper PH in the lower stage. For that purpose, a portion of the start end portion SP of the trough T is inserted below the vibrating plate VP of the dispersion feeder DF so that articles G do not overflow from the trailing end of the trough T. Furthermore, the respective troughs T of the radial feeders RF are arranged closely to each other and radially. In order to prevent overflow of articles G from between adjacent troughs T, a side wall of one of the adjacent troughs T overlaps with the side wall of the other trough.

The pool hopper PH temporarily retains the articles G discharged from the radial feeder RF, and when the weighing hopper WH in the lower stage empties by opening and closing a gate g of the weighing hopper WH, a gate g of the pool hopper PH is opened and closed in response to a command from the control unit CU described below and the articles G stored therein are discharged to the weighing hopper WH in the lower stage. Furthermore, a weighing sensor WS is mounted to the weighing hopper WH, and the weight detected thereby is input to the control unit CU and used in combination calculations. Each hopper PH and WH has a predetermined configuration, and description of a mechanism for opening and closing the gate and a support configuration of the hoppers PH and WH, or the like, are omitted.

Figure 5:
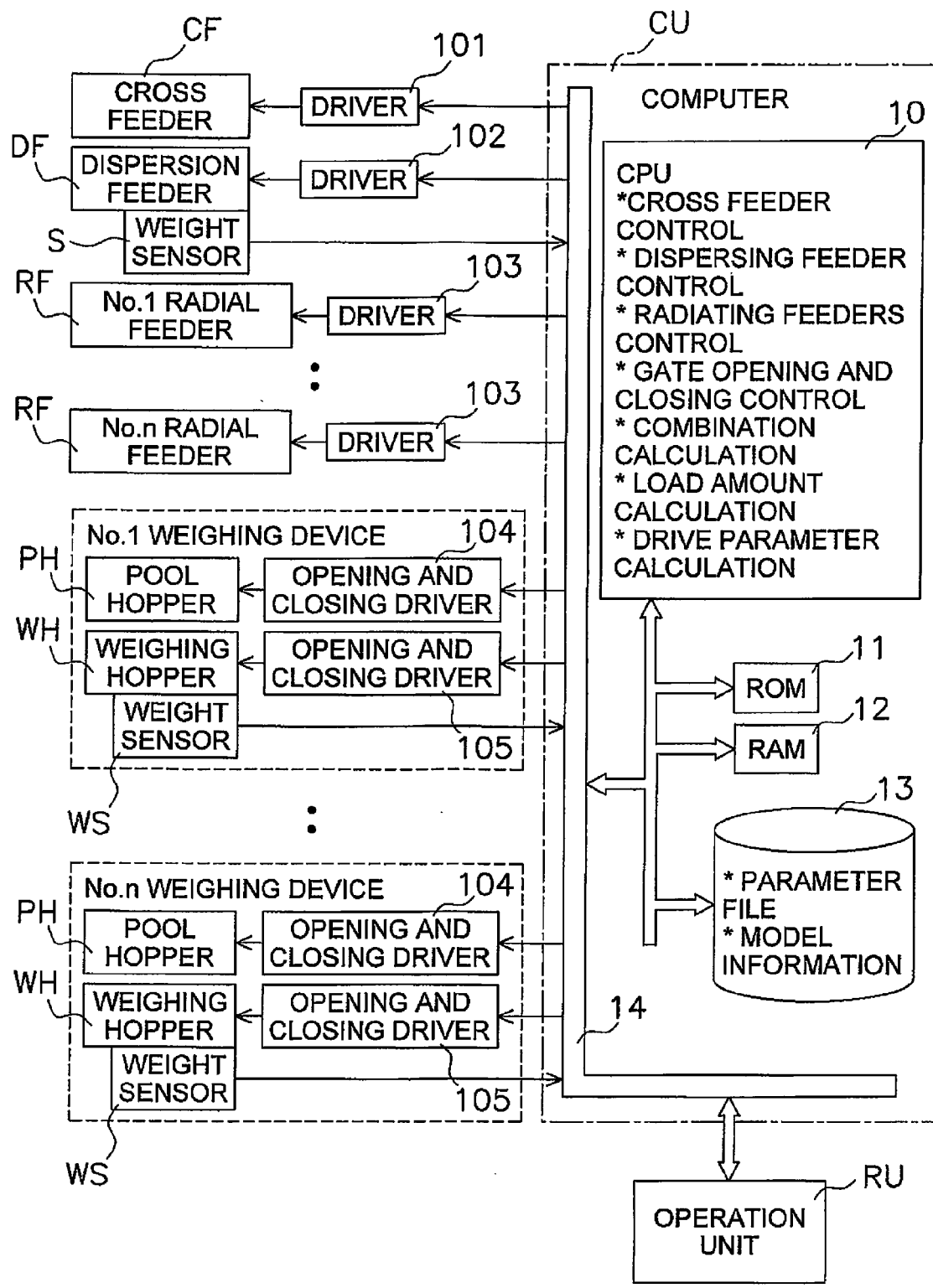
FIG. 5 is a block diagram of the configuration of the combination weighing device illustrated in FIG. 4.

The control unit CU is configured by a computer, and as illustrated in FIG. 5, includes a CPU 10, and a ROM 11, a RAM 12, and a hard disk 13 that are controlled by the CPU 10. The CPU 10, the ROM 11, the RAM 12, and the hard disk 13 or the like are mutually connected through a bus line such as a data bus, address bus, or the like. Furthermore, the control unit CU is connected through an interface 14 with a driver 101 for the cross feeder CF, a driver 102 for the dispersion feeder DF, drivers 103 for the radial feeders RF, opening and closing drivers 104 for the pool hoppers PH, opening and closing drivers 105 for the weighing hoppers WH, and an operation unit RU with a touch panel function. Furthermore, the control unit CU receives input of weighing signals converted to digital amounts from the weight sensor S that is configured to detect the load amount on the dispersion feeder DF and the weight sensor WS that is configured to detect the article weight in the weighing hoppers WH.

The ROM 11 stores various types of programs, and the CPU 10 reads out and executes those programs to control the cross feeder CF, to control the dispersion feeder DF, to control the radial feeder RF, and to control opening and closing of the gate for the pool hoppers PH and the weighing hoppers WH. The CPU 10 executes a combination calculation program to execute a predetermined combination calculation. That is to say, the article weight input from the weight sensor WS of each weighing hopper WH is combined, and a combination is selected in which the combined total weight is closest to the combination target weight, and in which a total weight falls within a permissible range. In relation to selected weighing hoppers WH, a discharge command is sent to the corresponding gate opening and closing drivers 105. In this manner, the opening and closing driver 105 opens and closes the gate g in a predetermined opening and closing mode.

Figure 6:
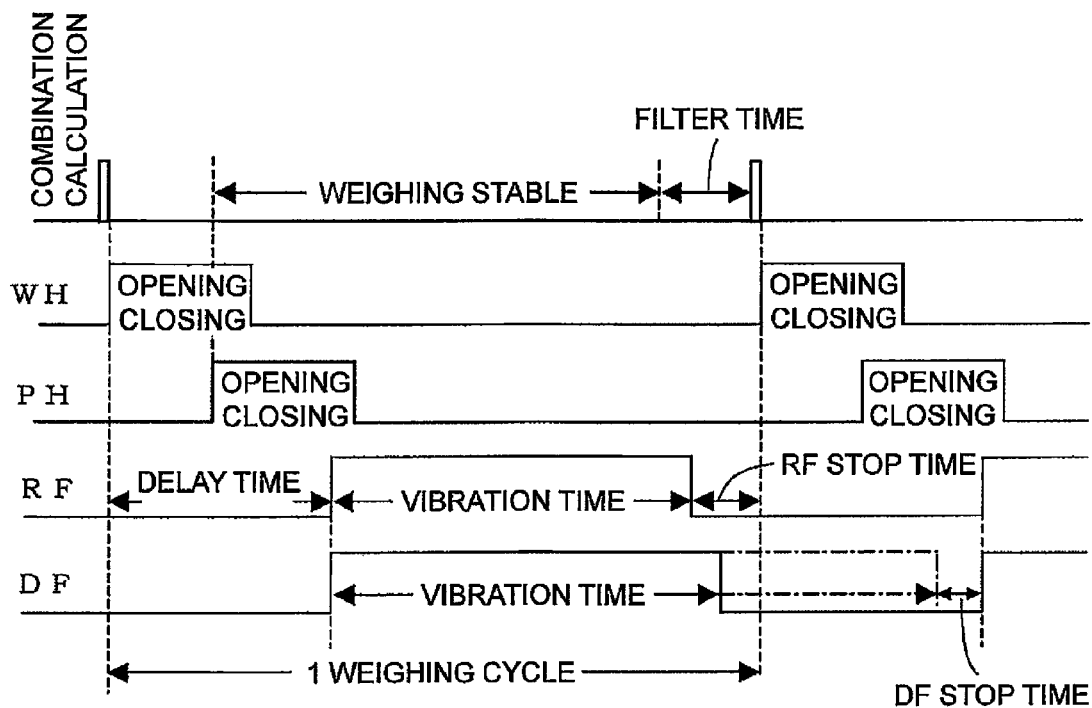
FIG. 6 is a timing chart of the combination weighing operation of the combination weighing device illustrated in FIG. 4.

Then, as illustrated in the timing chart in FIG. 6, after a predetermined time has elapsed since the weighing hoppers WH are released, the CPU 10 sends a discharge command to the opening and closing drivers 104 for the pool hoppers PH in the upper stage. Thereby, the gates g of the pool hopper PH open at a timing slightly before the closing of the gates g of the weighing hopper WH, and the articles discharged from the pool hoppers PH reach the gates g of the weighing hopper WH at a timing at which the gates g of the weighing hopper WH close.

Then, at a timing slightly before the gates g of the pool hoppers PH close, the CPU 10 sends a drive command to the drivers 103 of the corresponding radial feeders RF and the driver 102 of the dispersion feeder DF. Thereby, the radial feeders RF are driven from slightly before the gates g of the pool hoppers PH close, and the articles discharged from the radiating hoppers RH reach the gates g of the pool hoppers PH at a timing at which the gates g of the pool hoppers PH close.

In this manner, the pool hoppers PH in the upper stage are opened and closed in sequence after the weighing hoppers WH in the lower stage are opened and closed, and then the radial feeders RF and the dispersion feeder DF are driven. The driving control in relation to the radial feeders RF adjusts the vibration strength and the vibration time so that the discharge amount on each discharge from the individual radial feeders coincides with an ideal discharge weight. In this context, an ideal discharge weight is a value obtained by dividing the combination target weight by the ideal combination selected hopper number. The ideal combination selected hopper number can be set from the operation unit RU but is also stored in the hard disk 13 as a default depending on the model.

The vibration strength and the vibration time of the radial feeders RF can be adjusted individually for each of the radial feeders RF by designating each of the radial feeders RF from the operation unit RU, also can be adjusted altogether by designating all radial feeders RF. Furthermore, the adjustments may be performed both manually and automatically. When performing manual adjustments, the vibration strength and the vibration time of the radial feeders RF, being the object of the adjustment, are adjusted by operating an operation key displayed on the operation unit RU while referring to the average supply amount (article weight) to the corresponding weighing hoppers WH displayed on the operation unit RU. Alternatively, when performing automatic adjustments, the device is firstly set to an automatic adjustment mode by operating the operation unit RU. Then, the CPU 10 performs an automatic adjustment to the vibration strength or vibration time of the radial feeders RF so that the supply amount coincides with an ideal discharge weight as described above based on the average supply amount to the weighing hopper WH. However, immediately after the startup operation, the vibration strength and the vibration time are adjusted simultaneously in relation to all the radial feeders RF that are the object of the adjustment.

On the other hand, drive control in relation to the dispersion feeder DF adjusts the vibration strength and the vibration time of the dispersion feeder DF so that the discharge amount on each discharge from the radial feeders RF, that is to say, the amount identical to the combination target weight is discharged from the dispersion feeder DF to the radial feeders RF on each occasion. In addition, the load amount on the dispersion feeder DF is adjusted. These adjustment may be performed manually or automatically. When performing manual adjustments, the load amount, the vibration strength, the vibration time or the like being set are raised or lowered by operating an operation key displayed on the operation unit RU while referring to the load amount on the dispersion feeder DF and its reduction displayed on the operation unit RU. When performing an automatic adjustment, the load amount on the dispersion feeder DF and the vibration strength and the vibration time of the dispersion feeder DF are increased or decreased based on the number of units of the weighing hoppers WH that have fallen into a state of insufficient supply or excess supply, or based on the reduction amount of the load amount, or the like.

During operation, the combination target weight and the operating speed are normally set from the operation unit RU. For example, when the operating speed is set at 60 times/min, one weighing cycle as illustrated in FIG. 6 takes one second, and in that period, opening and closing of the weighing hoppers WH, and opening and closing of the pool hoppers PH are performed, and then the radial feeders RF and the dispersion feeder DF are driven. The time enabling opening and closing of the gate g of each hopper WH, PH can be adjusted, however, once it is set, the vibration time allocatable for each feeder DR, RF is limited to a given range.

Even if the electromagnetic feeder RV in the radial feeders RF is stopped, the articles moving on the troughs T do not stop immediately due to inertia. In this context, the vibration operation is configured to be stopped a predetermined time before proceeding the next weighing cycle. This is preset as the RF stop time. On the other hand, it is not necessary for the dispersion feeder DF to stop the vibration even after proceeding to the next weighing cycle, and in FIG. 6, it is illustrated that the vibration time can be extended to the next weighing cycle with a dot-and-dash line. However, when only the dispersion feeder DF is considered, it is not preferred that the previous vibration time overlaps with the next vibration time, and therefore as illustrated in FIG. 6, the vibration is stopped before proceeding the next vibration cycle. This is preset as the DF stop time.

In this manner, since the vibration time is limited by the weighing cycle, an adjustment of the discharge amount by each feeder DF, RF firstly prioritizes the adjustment to the vibration time, and when that reaches a critical limit, next, the vibration strength is adjusted. Furthermore, in regard to the vibration time and the vibration strength, the adjustment range is divided into 100 steps for example, and the values are configured to move up and down stepwise within that range. Needless to say, the 100 steps are merely exemplary, and the numerical value may be varied as required.

Furthermore, when the operating conditions are set or changed, the CPU 10 executes a load amount calculation program and a drive parameter calculation program to calculate the load amount for the dispersion feeder DF and the drive parameter for the dispersion feeder DF with which the discharge amount from the dispersion feeder DF and the discharge amount from the radial feeders RF balance out, that is to say, those in a stable supply condition. Next, the load amount for all radial feeders RF and the drive parameters for the radial feeders RF in a stable supply condition are calculated. Each of the calculated drive parameters is set as initial values to each feeder DF, RE The actual calculation equations for calculating the load amount and the drive parameters are described below, but will be outlined here. The load amount on the dispersion feeder DF in a stable supply condition is calculated by use of a layer thickness parameter related to the layer thickness of articles loaded onto the dispersion feeder, the combination target weight and the operating speed set from the operation unit RU, and other known parameters. Furthermore, the drive parameters for the dispersion feeder DF are calculated by use of the calculated load amount on the dispersion feeder DF, speed parameters specified by designating whether the articles are easy to convey or difficult to convey, the combination target weight set from the operation unit RU, and other known parameters.

The loading amount on all radial feeders RF in a stable supply condition is calculated by use of a layer thickness parameter related to the layer thickness of the articles loaded onto the radial feeders, the combination target weight, and other known parameters. The drive parameters for the radial feeders RF are calculated by use of the calculated load amount on the radial feeders, a speed parameter specified by designating whether the articles are easy to convey or difficult to convey, the combination target weight, and other known parameters.

Some of the parameters used herein are set as required for each type of article from the operation unit RU and include:

| Combination target weight | $X_{target}$ (g) |
| Operating speed | Speed (cycle/min) |

Designation of whether layer thickness of articles is large or small
Designation of whether articles are easy or difficult to convey.
Furthermore, the device parameters set in advance to the combination weighing device 100 include:

| Radius of vibrating plate VP of dispersion feeder DF | R (mm) |
| Length of trough T in conveying direction | L (mm) |
| Breadth of outlet of trough T | B (mm) |
| Number of radial feeders RF | $N_{all}$ |
| Number of combination selected hoppers | $N_{sel}$ |

Furthermore, the parameters specified by designating whether the layer thickness is large or small include:
The layer thickness parameter for when the layer thickness on the dispersion feeder DF is small: $A_{dfa}$, $B_{dfa}$,
The layer thickness parameter for when the layer thickness on the dispersion feeder DF is large: $A_{dfb}$, $B_{dfb}$,
The layer thickness parameter for when the layer thickness on the radial feeders RF is small: $A_{rfa}$, $B_{rfa}$,
The layer thickness parameter for when the layer thickness on the radial feeders RF is large: $A_{rfb}$, $B_{rfb}$,
The speed parameter of the dispersion feeder DF for articles that are easy to convey: $V_{df1}$,
The speed parameter of the dispersion feeder DF for articles that are difficult to convey: $V_{df2}$,
The speed parameter of the radial feeders RF for articles that are easy to convey: $V_{rf1}$,
The speed parameter of the radial feeders RF for articles that are difficult to convey: $V_{rf2}$.
Other parameters include:

| The stop time of the dispersion feeder DF | $t_{dfstop}$ |
| The stop time of the radial feeder RF | $t_{rfstop}$ |

All of these parameters are recorded in the hard disk 13.

Figure 7:
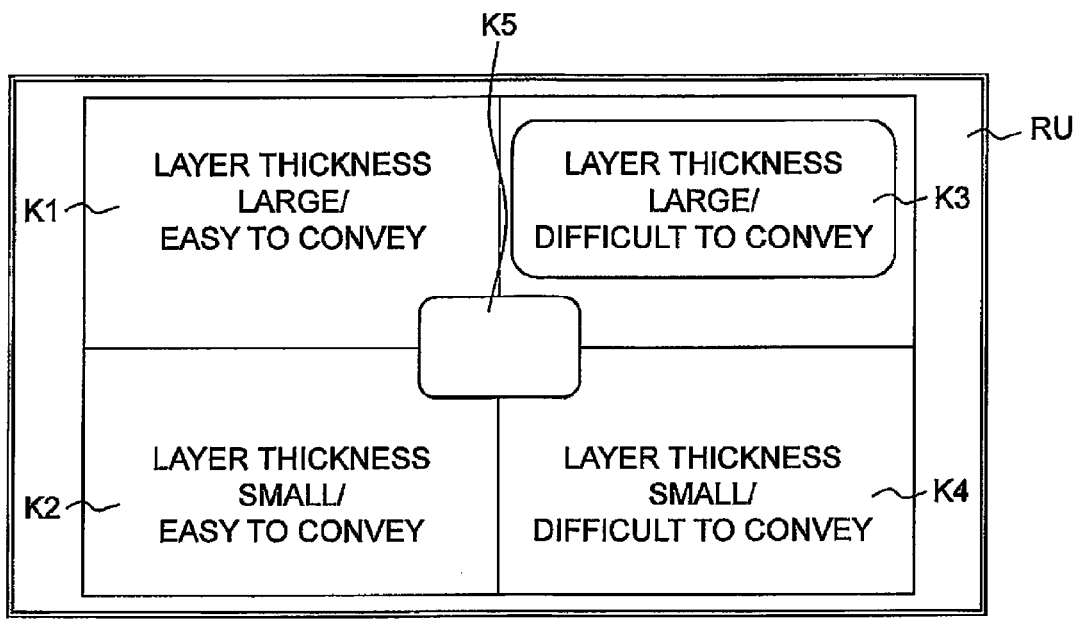
FIG. 7 is a plan view of an example of an operation screen of the combination weighing device illustrated in FIG. 4.
Figure 8:
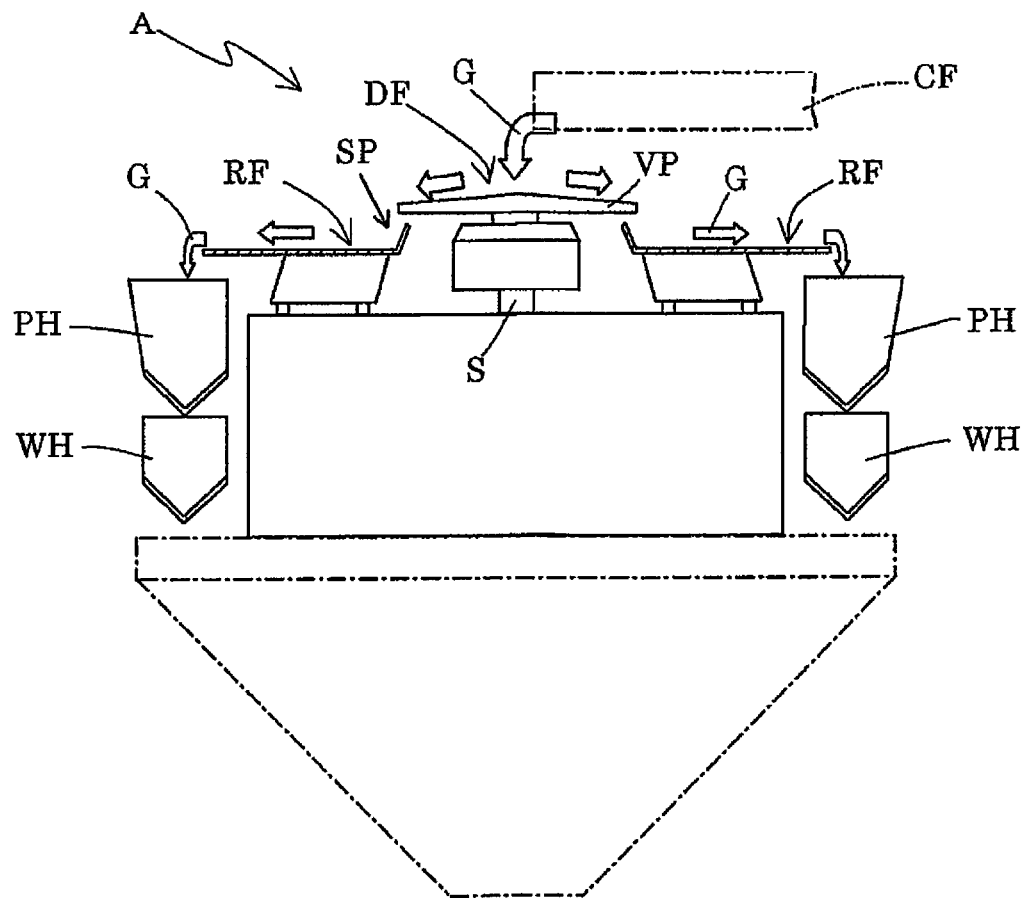
FIG. 8 is a partial sectional view illustrating the general features of a conventional dispersing and supplying device.

The operation unit RU is provided with a liquid crystal display, and receives manual input from an operator through a touch panel function. On the screen configured to set operating conditions, when a setting key (not illustrated) is operated, the screen is switched as illustrated in FIG. 7. The screen in FIG. 7, in which the vertical axis represents whether the layer thickness is small or large and the horizontal axis represents whether the article is easy or difficult to convey, is divided into four operation configurations. When the keys K1 to K4 representing the respective operational configurations are touched, the corresponding layer thickness parameters and the speed parameters are specified. For example, when the key K1 is touched, the following parameters are specified:
The layer thickness parameter for the dispersion feeder DF: $A_{dfb}$, $B_{dfb}$,
The layer thickness parameter for the radial feeders RF: $A_{rfb}$, $B_{rfb}$,
The speed parameter for the dispersion feeder DF: $V_{df1}$,
The speed parameter for the radial feeders RF: $V_{rf1}$.
For those standard configurations that do not fall into any of the above categories, the middle key K5 is touched and the drive parameter respectively for the dispersion feeder Df and the radial feeders RF recorded as a default value can be directly designated.

Next, in order to adapt the various articles that have different conveyance characteristics to the various models that have different specifications, the actual calculation equations used to calculate load amount on the dispersion feeder DF, the drive parameter for the dispersion feeder DF and the drive parameter for the radial feeders RF in an ideal state will be described in detail. These calculation equations are stored in the ROM 11 as programs.

Firstly, when it is assumed that the articles G are loaded on the vibrating plate VP of the dispersion feeder DF with the uniform layer thickness, the load amount $M_{df}$ of articles loaded onto the vibrating plate VP is given by:

$$M_{df} = \pi \times P_{df} \times R^2 \quad (14)$$

Wherein: $M_{df}$(g): Load amount
$P_{df}$(g/mm$^2$): Weight per unit area of vibrating plate VP
R (mm): Radius of vibrating plate VP Next, the discharge amount $t_g$ on each discharge from the dispersion feeder DF to the radial feeders RF is calculated as:

$$t_g = 2\pi R \times P_{df} \times v_{df} \times t_{df} \quad (15)$$

Therefore, when Equation 14 is substituted into Equation 15, $$t_g = 2 \times v_{df} \times t_{df} \times M_{df}/R \quad (16)$$

wherein: $t_g$ (g/cycle): Each discharge amount
$v_{df}$ (mm/sec): Moving speed of articles passing through outer periphery of vibrating plate VP
$t_{df}$ (sec/cycle): Vibration time of vibrating plate VP on each occasion Next, since the vibration strength of the dispersion feeder DF is proportional to the moving speed $v_{df}$:

$$v_{df} = V_{df} \times a_{df} \quad (17)$$

wherein: $v_{df}$ (mm/sec): Speed parameter of dispersion feeder DF
$a_{df}$: Vibration strength of dispersion feeder DF In this context, when Equation 17 is substituted into Equation 16, each discharge amount $t_g$ of the dispersion feeder DF is expressed as:

$$t_g = 2 \times V_{df} \times a_{df} \times t_{df} \times M_{df}/R \quad (18)$$

When it is represented that $G_{df} = 2 \times V_{df}/R$, Equation 18 is expressed as:

$$t_g = G_{df} \times a_{df} \times t_{df} \times M_{df} \quad (19)$$

That is to say, each discharge amount $t_g$ of the dispersion feeder DF is the product of the coefficient $G_{df}$ related to the speed parameter $V_{df}$, the vibration strength $a_{df}$, the vibration time $t_{df}$, and the load amount $M_{df}$.

Next, when it is assumed that the articles are loaded onto the radial feeders RF with the uniform layer thickness, the load amount $M_{rf}$ on all the radial feeders RF is expressed as:

$$M_{rf} = N_{all} \times B \times L \times P_{rf} \quad (20)$$

Wherein: $M_{rf}$(g): Load amount on troughs T of all radial feeders RF
$N_{all}$: Number of radial feeders RF
B: Breadth of outlet of trough T
L: Length of trough T in conveyance direction
$P_{rf}$(g/mm$^2$): weight per unit area on trough T Next, the discharge amount $X_{rf}$ on each discharge from the radial feeders RF that are selected in the combination is given by:

$$X_{rf} = B \times P_{rf} \times V_{rf} \times t_{rf} \times N_{sel} \quad (21)$$

When Equation 20 is substituted into Equation 21, it is expressed as:

$$X_{rf} = N_{sel} \times v_{rf} \times t_{rf} \times M_{rf}/(N_{all} \times L) \quad (22)$$

Wherein: $X_{rf}$(g): Each discharge amount from radial feeders RF
$N_{sel}$: Ideal number of combination selected hoppers
$v_{rf}$(mm/sec): Average moving speed of article at outlet of trough T
$t_{rf}$: Vibration time of radial feeders RF Since the vibration strength of the radial feeders RF is proportional to the moving speed $v_{rf}$:

$$v_{rr} = V_{rf} \times a_{rf} \quad (23)$$

wherein: $V_{rf}$ (mm/sec): Speed parameter of radial feeders RF
$a_{rf}$: Vibration strength of radial feeders RF In this context, when Equation 23 is substituted into Equation 22, each discharge amount $X_{rf}$ of the radial feeders RF is expressed as:

$$X_{rf} = N_{sel} \times V_{rf} \times a_{rf} \times t_{rf} \times M_{rf}/(N_{all} \times L) \quad (24)$$

When it is represented that $G_{rf} = V_{rf}/(N_{all} \times L)$, Equation 24 is expressed as:

$$X_{rf} = N_{sel} \times G_{rf} \times a_{rf} \times t_{rf} \times M_{rf} \quad (25)$$

That is to say, each discharge amount $X_{rf}$ of the radial feeders RF is the product of the coefficient $G_{rf}$ related to the speed parameter $V_{rf}$, the vibration strength $a_{rf}$, the vibration time $t_{rf}$ and the load amount $M_{rf}$.

Next, in order to express the load amounts $M_{df}$, $M_{rf}$ that are the unknowns with the combination target weight $X_{target}$ and the operating speed Speed, the required discharge amount q (g/sec) per unit time is given by:

$$q = X_{target} \times \text{Speed}/60$$

Therefore, when the weight $P_{df}$ per unit area on the vibrating plate VP and the weight $P_{rf}$ per unit area on the trough T are expressed with the required discharge amount q, they are expressed as:

$$P_{df} = (A_{df} \times q) + B_{df} \quad (26)$$

$$P_{rf} = (A_{rf} \times q) + B_{rf} \quad (27)$$

Therefore, the load amount $M_{df}$ of the vibrating plate in Equation 14 is expressed as:

$$M_{df} = \pi \times R^2 \times \{(A_{df} \times q) + B_{df}\} \quad (28)$$

Next, as illustrated in FIG. 6, the vibration time $t_{df}$ of the dispersion feeder DF is calculated by subtracting the DF stop time from the time required for one weighing cycle, and therefore:

$$t_{df} = 60/\text{Speed} - t_{dfstop} \quad (29)$$

wherein: $t_{dfstop}$ is the DF stop time.

Next, since each discharge amount $t_g$ from the dispersion feeder DF in a stable condition coincides with the combination target weight, by using a relationship that $t_g = X_{target}$ to Equation 19, the vibration strength $a_{df}$ for the dispersion feeder DF is expressed as:

$$a_{df} = X_{target}/(G_{df} \times M_{df} \times t_{df}) \quad (30)$$

Next, as illustrated in FIG. 6, the vibration time $t_{rf}$ of the radial feeders RF is determined with a delay time $t_{wh-rf}$ which is a time from when the gate g of the weighing hopper WH starts to open to when the radial feeders RF are driven, the operating speed being set, that is to say, the time required for one weighing cycle and the RF stop time. Therefore, the vibration time $t_{rf}$ is expressed as:

$$t_{rf} = (60/\text{Speed}) - t_{wh-rf} - t_{rfstop} \quad (31)$$

wherein: $t_{rfstop}$ is the RF stop time

Next, since each discharge amount $X_{rf}$ from the radial feeders RF in a stable state coincides with the combination target weight, by using a relationship that $X_{rf}=X_{target}$ to Equation 25, the vibration strength $a_{rf}$ for the radial feeders RF is expressed as:

$$a_{rf}=X_{target}/(N_{sel}\times G_{rf}\times t_{rf}\times M_{rf}) \quad (32)$$

From the above equations, the load amount $M_{df}$ on the dispersion feeder DF in a stable state is expressed as:

$$M_{df}=\pi\times R^2\times\{(A_{df}\times q)+B_{df}\} \quad (33)$$

The vibration time $t_{df}$ of the dispersion feeder DF is expressed as:

$$t_{df}=(60/\text{Speed})-t_{dfstop} \quad (34)$$

The vibration strength $a_{df}$ of the dispersion feeder DF is expressed as:

$$a_{df}=X_{target}(G_{df}\times M_{df}\times t_{df}) \quad (35)$$

The load amount $M_{rf}$ on all the radial feeders RF is expressed as:

$$M_{rf}=N_{all}\times B\times L\times\{(A_{rf}\times q)+B_{rf}\} \quad (36)$$

The vibration time $t_{rf}$ of each radial feeder RF is expressed as:

$$t_{rf}=(60/\text{Speed})-t_{wh-rf}-t_{rfstop} \quad (37)$$

The vibration strength $a_{rf}$ on each radial feeder RF becomes:

$$a_{rf}=X_{target}/(N_{sel}\times G_{rf}\times t_{rf}\times M_{rf}) \quad (38)$$

Since the vibration time $t_{df}$ of Equation 34 and the vibration time $t_{rf}$ of Equation 37 are the maximum vibration times that can be allocated within one weighing cycle, in the actual calculation, a shorter time is calculated, for example by multiplying an arbitrary value such as 50% in each equation.

Here, the layer thickness parameters and the speed parameters are unknowns. In order to obtain those unknowns, representative articles being easy to convey, representative articles being difficult to convey, articles with a high density, and articles with a low density are used in experiments for obtaining the layer thickness parameters and the speed parameters. The results are shown in the tables below.

TABLE 1

Speed Parameters

|  |  | Easy to Convey | Difficult to Convey |
|---|---|---|---|
| Vrf (mm/sec) of Radial Feeders RF |  | 3 | 1.5 |
| Vdf (mm/sec) of Dispersion Feeder DF | Small Layer Thickness (a) | 1 | 0.5 |
|  | Large Layer Thickness (b) | 0.4 | 0.2 |

TABLE 2

Layer Thickness Parameters

|  |  | Small Layer Thickness (a) | Large Layer Thickness (b) |
|---|---|---|---|
| Radial Feeders RF | Brf (g/mm²) | 0.01 | 0.02 |
| Dispersion Feeder DF | Adf (sec/mm²) | 0.0003 | 0.0002 |
|  | Bdf (g/mm²) | 0.005 | 0.01 |

These parameters are stored in the hard disk 13. When the operation screen shown in FIG. 7 is used to designate whether the layer thickness is small or large, and whether the articles are easy or difficult to convey, the corresponding layer thickness parameters and speed parameters are read out, and used in Equations 33 to 38 to respectively calculate the load amount $M_{df}$ on the dispersion feeder DF, the vibration strength $a_{df}$ and the vibration time $t_{df}$ for the dispersion feeder DF, and the vibration strength $a_{rf}$ and the vibration time $t_{rf}$ for the radial feeders RF.

Next, the operation at the startup will be described.

Firstly, an operator operates the operation unit RU to input the combination target weight and the operating speed, and after the operating screen illustrated in FIG. 7 is displayed, the keys K1 to K5 are used to designate the degrees of conveyance difficulty and layer thickness of the articles being the object of the weighing operation. As a result, the layer thickness parameters and the speed parameters corresponding to the designated keys K1 to K5 are read out from the hard disk 13. The CPU 10 calculates the load amount, the vibration strength and the vibration time of the dispersion feeder DF and the vibration strength and the vibration time of the radial feeder RF with Equations 33 to 38 by using the layer thickness parameters and the speed parameters that are read out and other required parameters. Next, the CPU 10 sets those calculated values as initial values for the dispersion feeder DF and radial feeders RF.

When an operating key (not illustrated) is operated in a state in which the articles G are not supplied to the dispersion feeder DF, the control unit CU receives input of the weight from the weight sensors WS for the weighing hoppers WH and checks for the presence or absence of articles. Initially, since both the hoppers PH and WH are empty, the control unit CU opens and closes the gate g of each pool hopper PH, and then drives each radial feeder RF and the dispersion feeder DF with the vibration strength and vibration time set as initial values.

Also, the control unit CU receives input of the article weight loaded onto the dispersion feeder DF from the weight sensor S and checks the load amount on the dispersion feeder DF. When the load amount is less than a lower limiting value, the cross feeder CF is driven, and when the load amount reaches an upper limiting value, the cross feeder CF is stopped. Initially, since there are no articles on the dispersion feeder DF, the control unit CU keeps the cross feeder CF driving, and repeatedly, makes the gate g of each pool hopper PH perform opening/closing operation and subsequently drive each feeder RF, DF so that the articles G sequentially flow on the dispersion feeder DF, the radial feeders RF, and the pool hoppers PH and are supplied to the weighing hopper WH.

When articles are supplied to the weighing hoppers WH in this manner, the control unit CU receives input of the article weight of each weighing hopper WH to thereby execute a combination calculation, and identifies an optimal combination in which the combination weight falls within the permissible range and indicates a value closest to the combination target weight, and on that basis, sends a discharge command to the opening and closing driver 105 of each corresponding weighing hopper WH. Accordingly, the gates g of the weighing hoppers WH are opened and closed, and the articles are discharged to the collection chute CS. Then, the control unit CU sends a discharge command to the opening and closing drivers 104 of the pool hoppers PH corresponding to the weighing hoppers WH that has become empty. Accordingly, the gates g of the pool hoppers PH are opened and closed at the predetermined timing illustrated in FIG. 6, and the articles are supplied to the empty weighing hoppers WH. Then, the control unit CU sends a drive command to the driver 102 of the dispersion feeder DF and the drivers 103 of the radial feeders RF corresponding to those pool hoppers PH. Accordingly, the radial feeders RF and the dispersion feeder DF are driven at the predetermined timing illustrated in FIG. 6, and the articles are supplied from the radial feeders RF to the empty pool hoppers PH, and a predetermined amount of articles are discharged from the dispersion feeder DF towards the radial feeders RF.

By repeating this operation, it gradually shifts to a stable state. When it is set to automatic adjustment mode, feedback control of the vibration strength and the vibration time of each radial feeder RF, based on the average supply amount after a predetermined time from the time when articles begin to be supplied to each weighing hopper WH, is started An embodiment of the present invention is described above, but the present invention is not limited to that, and another embodiment may be adopted. For example, in the present embodiment, a combination weighing is performed based on the article weight, but alternatively it is similarly applicable to the combination counting based on the number of articles that is calculated by dividing the article weight supplied to each weighing hopper WH by a unit weight. Furthermore, in the above embodiment, although the layer thickness parameters and the speed parameters are obtained experimentally in relation to a total of four types in which the articles are easy or difficult to convey and the layer thickness of the articles is small or large, it is preferable that layer thickness parameters and the speed parameters are obtained for various intermediate configuration in addition to those four types. In this manner, the general applicability of the device can be enhanced. In the above embodiment, the layer thickness in the ideal state and the difficulty of conveyance are designated on the operating screen, but alternatively, the corresponding layer thickness parameters and speed parameters may be specified by designating whether the articles are wet or dry, and whether the interior content (g) is heavy or light relative to the volume of the packaged goods.

The combination weighing device 100 according to the first embodiment may be provided with a plurality of multi-stage digital filters in the same manner as the combination weighing device 1 described below in relation to a second embodiment. Then, the evaluation and selection of the multistage digital filters may be performed in the combination weighing device 100 similarly to the combination weighing device 1 according to the second embodiment. Alternatively, as described in relation to modified example 2B of the second embodiment, a filter may be generated based on a plurality of multistage digital filters.

<Second Embodiment>

(1) Overall Configuration

Figure 9:
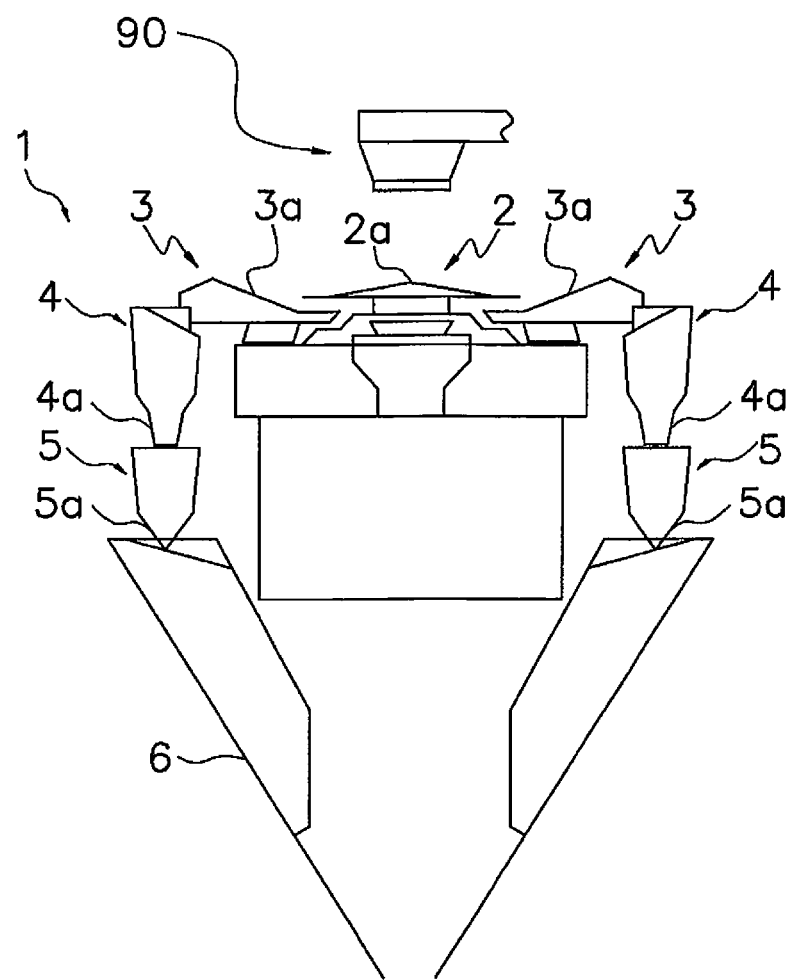
FIG. 9 is a vertical sectional schematic view of the combination weighing device according to a second embodiment of the present invention.

FIG. 9 illustrates a combination weighing device 1 according to the second embodiment of the present invention. The combination weighing device 1 performs a combination calculation of weighing values of articles in a plurality of weighing hoppers 5, selects a combination of the articles with which the result of the combination calculation takes a value that falls within a predetermined permissible range, and discharges articles in the weighing hoppers 5 included in the combination from the combination weighing device 1.

Figure 10:
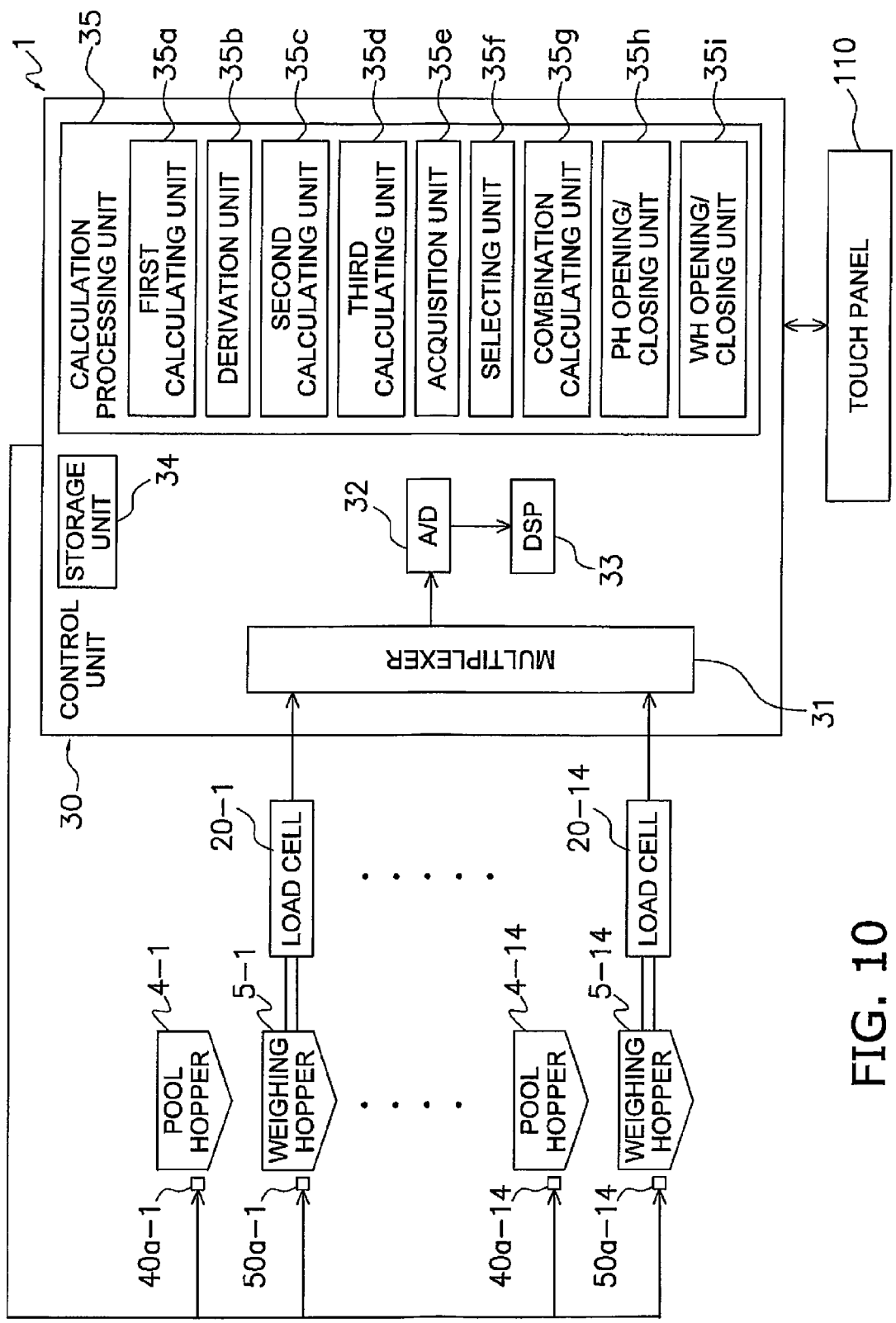
FIG. 10 is a block diagram of the configuration of the combination weighing device illustrated in FIG. 9.

As illustrated in FIG. 9 and FIG. 10, the combination weighing device 1 includes a dispersion feeder 2, fourteen radial feeders 3, fourteen pool hoppers 4, fourteen weighing hoppers 5, a collection chute 6, a touch panel 110, and a control unit 30.

(2) Detailed Configuration (2-1) Dispersion Feeder

The dispersion feeder 2 is disposed on an upper portion of the combination weighing device 1, receives a supply of articles being objects to be weighed from a supply conveyer 90 above the dispersion feeder 2, and conveys the supplied articles while dispersing them. The dispersion feeder 2 includes a vibrating plate 2a.

The vibrating plate 2a is a flat conical table shaped member. The vibrating plate 2a receives a supply of articles from the supply conveyer 90, conveys the articles in a radial direction while dispersing them in a peripheral direction and thereby supplies the articles to troughs 3a of the radial feeders 3.

(2-2) Radial Feeders

Fourteen radial feeders 3 are arranged radially around the dispersion feeder 2, and convey articles discharged from the dispersion feeder 2. Each radial feeder 3 has a trough 3a.

The trough 3a is arranged radially around the vibrating plate 2a. Each trough 3a conveys articles in a radial direction towards the outer edge of each trough 3a, and supplies the articles to a pool hopper 4 that is disposed below the outer edge side of each trough 3a.

(2-3) Pool Hopper

One pool hopper 4 is disposed below the outer edge side of the trough 3a of each radial feeder 3, and articles that are supplied (discharged) from the trough 3a that is disposed thereabove are temporarily stored in the pool hopper 4. The pool hopper 4 has a PH gate 4a at the bottom portion of the pool hopper 4. When the PH gate 4a is opened, articles are supplied to the weighing hopper 5 disposed below the pool hopper 4. The PH gates 4a are opened and closed when link mechanisms (not illustrated) are operated by stepping motors 40a-1~14 illustrated in FIG. 10. The stepping motors 40a-1~14 are operated by a command from a PH opening/closing unit 35h of the control unit 30 described below. The opening and closing operation of each PH gate 4a is independent to an opening and closing operation of another PH gate 4a.

(2-4) Weighing Hopper

The weighing hopper 5 is disposed below each pool hopper 4 and receives articles supplied from the pool hopper 4. The weighing hopper 5 weighs the weight of the supplied articles with load cells 20-1~14 illustrated in FIG. 10. The weighing hopper 5 has a WH gate 5a at the bottom portion of the weighing hopper 5. The WH gates 5a are opened and closed when link mechanisms (not illustrated) are operated by a stepping motors 50a-1~44 illustrated in FIG. 10. The stepping motors 50a-1~14 are operated by a command from an WH opening/closing unit 35i of the control unit 30 described below. The opening and closing operation of each WH gate 5a is independent to an opening and closing operation of another WH gate 5a.

The load cell 20-1~14 illustrated in FIG. 10 is an example of a weighing unit configured to weigh the articles retained in each weighing hopper 5-1~14. The weighing result of the articles by the load cell 20-1~44 is output as a weighing signal. The weighing signal is sent as required through an amplifier (not illustrated) to a multiplexer 31 of the control unit 30 described below. The load cells 20-1~14 are load cells that are provided with strain gauges such as disclosed in Japanese Patent Application Laid-Open No. 2001-343294 whereby displacement associated with the loading weight of a strain body, that includes a movable portion and a fixed portion, is detected by changes in the resistance of the strain gauge, and the detection result is sent as a weighing signal to the multiplexer 31.

(2-5) Collection Chute

The collection chute 6 collects articles that are supplied from the weighing hopper 5 and discharges them. The discharged articles are supplied to a packaging device or the like (not illustrated) that is disposed below the collection chute 6.

(2-6) Touch Panel

The touch panel 110 is a liquid crystal display (LCD) that has both input and display functions, and therefore can function as both an input unit and an output unit. The touch panel 110 is provided for a user of the combination weighing device 1, and receives input such as various settings or the like related to combination weighing and displays the operating state of the combination weighing device 1. The user performs various types of input to the combination weighing device 1 by presses a button or the like displayed on the touch panel 110.

The information input onto the touch panel 110 includes the operating speed. The operating speed is the frequency of the combination weighing (combination calculation) executed per predetermined time by the combination weighing device, and is a value determined depending on the needs of a user. The operating speed is input not only for setting the actual operating conditions, but may be input for a simulation in order to comprehend total error expected values E1~5 for each of multistage digital filters DF1~5 described below.

The information output to the touch panel 110 includes the total error expected values E1~5 that are calculated for each of the multistage digital filters DF1~5. The total error expected values E1~5 are displayed for each of the multistage digital filters DF1~5.

(2-7)

The control unit 30 includes a CPU, a storage unit 34, a multiplexer 31, an A/D converter 32, a digital signal processor (DSP) 33, or the like. The storage unit 34 is configured by a ROM, a RAM, or the like.

During control by the control unit 30, the CPU reads programs stored on the storage unit 34 and executes various control operations as a calculation processing unit 35. As illustrated in FIG. 10, the calculation processing unit 35 functions as a first calculating unit 35a, a derivation unit 35b, a second calculating unit 35c, a third calculating unit 35d, an acquisition unit 35e, a selecting unit 35f, a combination calculating unit 35g, a PH (pool hopper) opening/closing unit 35h, and a WH (weighing hopper) opening/closing unit 35i.

(2-7-1) Multiplexer

The multiplexer 31 selects one weighing signal from the weighing signals from the load cells 20-1~14 in accordance with the command from the DSP 33 described below and sends the signal to the A/D converter 32.

(2-7-2) A/D Converter

The A/D converter 32 converts a weighing signal that is an analog signal acquired from the multiplexer 31 to a digital signal in accordance with a timing signal sent from the DSP 33, and sends the digital signal to the DSP 33.

(2-7-3) DSP

The DSP 33 executes filter processing to the digital signal sent from the A/D converter 32 (the weighing signal converted to the digital signal).

The DSP 33 includes five FIR-type multistage digital filters DF1~5 that have different filter characteristics respectively. The multistage digital filters DF1~5 are not limited to the FIR configuration, and may be configured as an IIR type. The multistage digital filters DF1~5 are respectively configured from the staged filter having three stages. A filter processing can be performed with the staged filter of larger stage number in response to the time required for filter processing (as the time for filter processing increases).

FIG. 11 illustrates an example of the required processing times that are necessary to execute the filter processing with the staged filter of each stage number in each of the multistage digital filters DF1~5. As illustrated in FIG. 11, even when using the same multistage digital filters DF1~5, the required processing time increases as the stage number of the staged filter increases. When the stage number is same, the required processing time increases as the numeral attached to the reference signs of the multistage digital filters DF1~5 increases.

FIG. 12 illustrates an example of the average errors in relation to the multistage digital filters DF1~5 when the weighing signal for the load cell 20 is filter processed by the staged filter of each stage number. As illustrated in FIG. 12, even when using the same multistage digital filters DF1~5, in principle, the error is reduced as the stage number of the staged filter increases (there is a case that no change is seen in the error even when the numeral increases). When the stage number is same, in principle, the error is reduced as the numeral attached to reference signs of the multistage digital filters DF1~5 increases (there is a case that no change is seen in the error even when the numeral increases).

The multistage digital filters DF1~5 execute filter processing to the digital signal that is sent from the A/D converter 32 using the staged filter having the largest stage number that can be executable at a timing of the filter processing. The weighing signal after filter processing is stored in the storage unit 34 separately for each weighing hopper 5 as the weight (weighing value) of the articles retained in the weighing hopper 5. When the weighing signal after filter processing is stored in the storage unit 34, information is overwritten when a result that is performed by filter processing using the staged filter having smaller stage number is already stored in the storage unit 34.

(2-7-4) Storage Unit

The storage unit 34 stores programs to be read and executed by the CPU, and various types of information and data or the like required for calculation processing.

(2-7-5) Calculation Processing Unit

The calculation processing unit 35 functions as the first calculating unit 35a, the derivation unit 35b, the second calculating unit 35c, the third calculating unit 35d, the acquisition unit 35e, the selecting unit 35f, the combination calculating unit 35g, the PH opening/closing unit 35h, and the WH opening/closing unit 35i, or the like.

The calculations for evaluation of the multistage digital filters DF1~5 are mainly performed by the first calculating unit 35a, the derivation unit 35b, the second calculating unit 35c, and the third calculating unit 35d. The evaluation of the multistage digital filters DF1~5 is executed upon input of the operating speed into the touch panel 110, but is no limited to only that time.

(2-7-5-1) First Calculating Unit

The first calculating unit 35a calculates first to Nth available filter processing times Tf1~N. The Nth available filter processing time TfN is the time during which filter processing on the weighing signal is available from the startup time of the combination weighing cycle (termed the reference cycle) at which given weighing hoppers 5 receive supply of articles from the pool hoppers 4 that are positioned above the weighing hoppers 5 to the startup time of the next subsequent combination weighing cycle (when those weighing hoppers 5 are not selected in the combination up to the previous combination weighing cycle after the reference cycle, in other words, when those weighing hoppers 5 are not selected in the first to (N−1)th combination weighing cycle after the reference cycle).

The first to the Nth available filter processing times Tf1~N will be described with reference to FIG. 13. In this context, the first to the Nth available filter processing times Tf1~N will be described with reference to an example of the operation of the weighing hopper 5-1.

Figure 13:
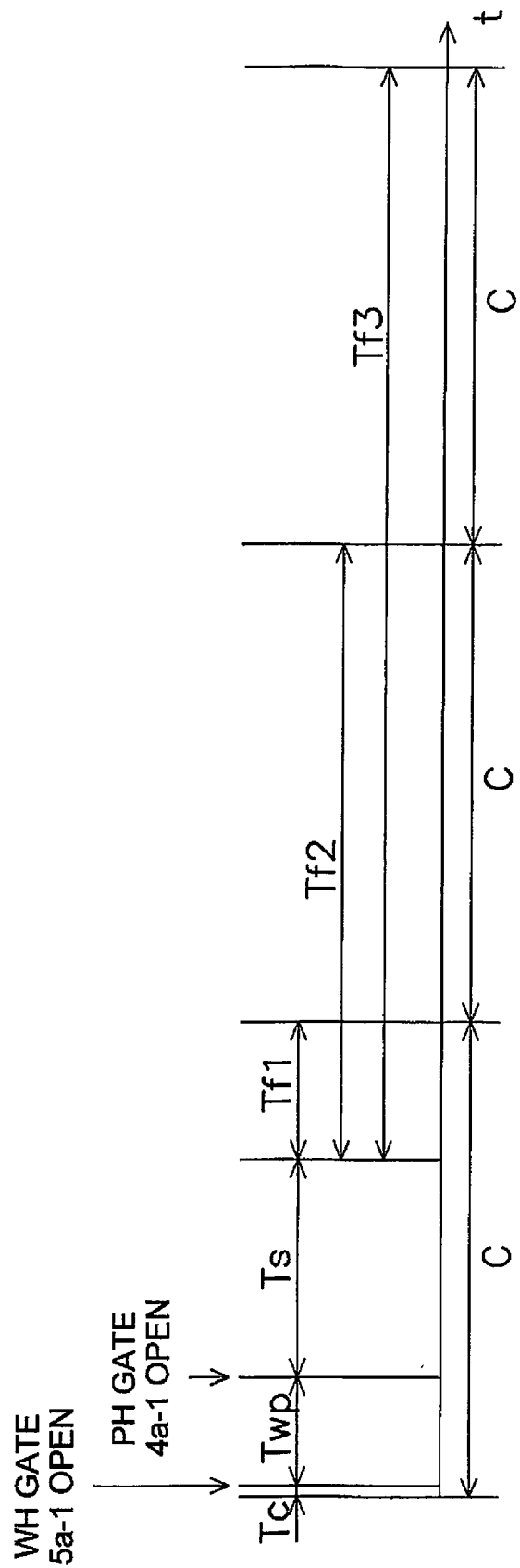
FIG. 13 describes the calculation of an available filter processing time.

FIG. 13 describes the startup time of the reference cycle as the time point on the left end of the figure with the time axis being the horizontal axis.

The reference sign C in FIG. 13 denotes a cycle time C per combination weighing cycle. The cycle time C is calculated as the inverse of the operating speed input from the touch panel 110. The starting point for each cycle time C is the time at which the combination calculation is started by the combination calculating unit 35g described below.

The reference sign Tc in FIG. 13 denotes a calculation time Tc used in the combination calculation by the combination calculating unit 35g described below. The calculation time Tc is a fixed value, and is stored as an initial value in the storage unit 34.

The reference sign Twp in FIG. 13 denotes a delay time Twp, and is expressed as the time described below.

It is assumed that the combination calculation by the combination calculating unit 35g is finished, and the weighing hopper 5-1 is selected in the combination at the reference cycle. After completion of the combination calculation (after elapse of the calculation time Tc from starting of the reference cycle), the WH gate 5a-1 is opened in response to a command from the WH opening/closing unit 35i described below, and the articles in the weighing hopper 5-1 are discharged into the collection chute 6. Thereafter; prior to the closing of the WH gate 5a-1, the PH gate 4a-1 is opened in response to a command from the PH opening/closing unit 35h described below, and articles in the pool hopper 4-1 are supplied to the weighing hopper 5-1. The time until opening of the PH gate 4a-1 after opening of the WH gate 5a-1 is the delay time Twp.

The opening of the PH gate 4a-1 at the timing at which the WH gate 5a-1 is still open is a measure to enable the operating speed to take the highest possible value despite of the fall time of articles to reach the weighing hopper 5-1 from the PH gate 4a-1. The WH gate 5a-1 is closed before the timing at which the articles reach the weighing hopper 5-1.

The value for the delay time Twp is a value that differs depending on the conditions such as the type and the amount of articles to be weighed, and is stored in the storage unit 34 separately by conditions. Furthermore, the value of the delay time Twp can be changed by input from the touch panel 110.

The reference sign Ts in FIG. 13 denotes a stabilizing time Ts at which the PH gate 4a-1 opens, the articles reach the weighing hopper 5-1 and the articles are in a stable state in the weighing hopper 5-1. The value of the stabilizing time Ts is a value that differs depending on the conditions such as the type and the amount of articles to be weighed, and is stored in the storage unit 34 separately by conditions. Furthermore, the value of the stabilizing time Is can be changed by input from the touch panel 110.

A weighing signal that can be filter processed is not sent to the DSP 33 during the calculation time Tc, the delay time Twp and the stabilizing time Ts. Therefore, the first available filter processing time Tf1 that can be used for filter processing in the period from the starting time of the reference cycle to the starting time of the next cycle is given by the following equation.

$$Tf1=C-Tc-Twp-Ts \tag{39}$$

After the next combination weighing cycle, whole cycle time C can be used for filter processing since the supply of articles from the pool hopper 4-1 to the weighing hopper 5-1 is not performed. Therefore, the Nth available filter processing time TfN from the reference cycle to the Nth cycle is given by the following equation.

$$TfN=Tf1+\{(N-1)\times C\}=(N\times C)-Tc-Twp-Ts \text{(where } N \text{ is an integer)} \tag{40}$$

The first calculating unit 35a calculates the first to the Nth available filter processing time Tf1~N based on the operating speed input from the touch panel 110, the calculation time Tc stored in the storage unit 34, the delay time Twp, and the stabilizing time Ts.

(2-7-5-2) Derivation Unit 35b

The derivation unit 35b compares the first to the Nth available filter processing time Tf1~N with the required processing times for the staged filters of respective stage number in relation to the multistage digital filter DF1~5 and derives a stage number of the staged filter in which filter processing will be completed before finishing of the first to the Nth available filter processing time Tf1~N as the available stage number of processing for each multistage digital filter DF1~5.

Specifically, an example will be described with reference to an example illustrated in FIG. 11. For example, it is assumed that the operating time is 60 cycles/min (the cycle time C is 1000 milliseconds (msec)), and that the first available filter processing time Tf1 is 380 msec.

In this case, for example, since the required processing time (200 msec) of stage number 1 of the staged filter in the multistage digital filter DF1 is less than the first available filter processing time Tf1 (380 msec), filter processing with the staged filter of the stage number 1 is enabled in relation to the weighing signal from the reference cycle to the first combination weighing cycle (the combination weighing cycle coming after next the reference cycle). In the second cycle after the reference cycle, since the required processing time (800 msec) of the staged filter of the stage number 3 is less than the second available filter processing time Tf1 (1380 msec), filter processing with the staged filter of the stage number 3 is enabled in relation to the weighing signal.

For example, in relation to the multistage digital filter DF5, since the required processing times of the staged filters of all stage numbers are greater than the first available filter processing time Tf1 (380 msec), no available stage number of processing is present for the combination weighing cycle coming after next the reference cycle (the first combination weighing cycle after the reference cycle). That is to say, filter processing on the weighing signal cannot be performed in the first cycle after the reference cycle by use of the multistage digital filter DF5. Next, in the second cycle after the reference cycle, since the required processing time (800 msec) of the staged filter of the stage number 2 is less than the second available filter processing time Tf2 (1380 msec), filter processing with the staged filter of the stage number 2 is enabled in relation to the weighing signal. In addition, in the third cycle after the reference cycle, since the required processing time (1600 msec) of the staged filter of the stage number 3 is less than the third available filter processing time Tf3 (2380 msec), filter processing with the staged filter of the stage number 3 is enabled in relation to the weighing signal.

(2-7-5-3) Second Calculating Unit 35c

The second calculating unit 35c calculates individual error expected values e1~5 of each load cell 20-1~44 for each of the multistage digital filters DF1~5. In the present embodiment, the individual error expected values e1~5 are calculated under a condition that the error of each of the load cells 20-1~14 is the same.

Each of the individual error expected values e1~5 is a value probabilistically calculated how much error is expected, in a given combination weighing cycle, between the weight value obtained by filter processing of the weighing signal from the load cell 20-1~14 provided in a given weighing hopper 5-1~14 with the DSP 33 and the actual weight value of articles in the weighing hopper 5.

More specifically, each of the individual error expected values e1~5 is calculated by multiplying the probability that each stage number of the staged filter is selected during a combination weighing in each of the multistage digital filters DF1~5 by the average error of the staged filter of each stage number in each multistage digital filter DF1~5 as illustrated in FIG. 12 and then integrating the multiplied values for all stage numbers.

The selection probability of each stage number is calculated based on the available stage number of processing derived by the derivation unit 35b, a selection head number that is the number of weighing hoppers selected in the combination calculation, and a stable head that is the number of selectable weighing hoppers in the combination calculation.

The selection head number differs depending on the target weight of the combination calculation (combination target weight), and for example, can be calculated by dividing the target weight by the average weight of articles retained in each weighing hopper 5.

The stable head number is calculated from the available stage number of processing for each of the first to the Nth available filter processing times Tf1~N and the selection head number. For example, when K pieces of weighing hoppers 5 are selected from the fourteen weighing hoppers 5, if all weighing signals can be used in the cycle coming after next the reference cycle, that is to say, if there is an available stage number of processing in a multistage digital filters DF1~5 that is the object of calculation for the individual error expected values e1~5 in the first available filter processing time Tf1, the stable head number will take a value of fourteen. If there is no available stage number of processing in the first available filter processing time Tf1 and there is an available stage number of processing in the second available filter processing time Tf2, the stable head number will be (14-K).

The selection head number and stable head number may be values that are calculated by the second calculating unit 35c, or may be values that can be input by a user from the touch panel 110, or may be values that are updated in response to actual operating data acquired by the acquisition unit 35e described below. In the present embodiment, the initial values for the selection head number and the stable head number are input by a user form the touch panel 110. After starting operation of the combination weighing device 1, they are updated in response to actual operating data acquired by the acquisition unit 35e described below.

An actual example will be described in respect to the calculation of the selection probability of each stage number.

In this context, a calculation example of the selection probability of each stage number for the multistage digital filter DF1 will be described by use of the same numerical values with the values used in the description of the specific example of the derivation unit 35b. It is assumed that the selection head number is five.

Firstly, since the required processing time (200 msec) of the staged filter of the stage number 1 is less than the first available filter processing time Tf1 (380 msec), the stable head number is fourteen. Furthermore, under the conditions of the actual example above, in the multistage digital filters DF1, the available stage number of processing in the first available filter processing time Tf1 is 1 and the available stage number of processing in the second available filter processing time Tf2 is 3. That is to say, in a given combination weighing cycle, the weighing signal sent from the load cell 20 corresponding to the weighing hopper 5 that is selected in the combination in the previous combination weighing cycle can only be filter processed with the staged filter of the stage number 1. On the other hand, the weighing signal sent from the load cell 20 corresponding to the weighing hopper 5 that is not selected in the combination in the previous combination weighing cycle can be filter processed with the staged filter of the stage number 3. Accordingly, since it is assumed that the selection head number is 5, during steady-state conditions, the probability that stage number 1 is selected is 5/14 and the probability that stage number 3 is selected is 9/14.

In a similar way, the selection probability of each stage number can be calculated for the other multistage digital filters DF2~5.

Further, the calculation method for the individual error expected values e1~5 will be described by use of the example same as the above.

In the multistage digital filter DF1, the error of stage number 1, stage number 2 and stage number 3 are respectively 0.05 g, 0.03 g, and 0.01 g as shown in FIG. 12. Furthermore, as described above, the multistage digital filter DF1 has a selection probability in relation to stage number 1, stage number 2 and stage number 3 respectively of 5/14, 0 and 9/14. Therefore, the individual error expected value e1 is calculated as e1=5/14×0.05 g+0×0.03 g+9/14×0.01 g=0.024 g.

(2-7-5-4) Third Calculating Unit

The third calculating unit 35d calculates a total error expected value E1~5 with respect to the total weight of articles after the combination weighing for each of the multistage digital filters DF1~5 based on the individual error expected values e1~5 for each of the multistage digital filters DF1~5.

Herein, since it is assumed that all the weighing hoppers 5 has the same individual error expected values e1~5, the total error expected value E1~5 is calculated as shown below.

$$EN=\sqrt{(L \times eN^2)}(N=1\sim5) \tag{41}$$

The reference sign L denotes the selection head number.

The total error expected values E1~5 calculated in the third calculating unit 35d are displayed on the touch panel 110 respectively for multistage digital filters DF1~5.

(2-7-5-5) Acquisition Unit

The acquisition unit 35e acquires the selection head number and the stable head number during actual operation.

More specifically, the stable head number is acquired as the average number of weighing signals that are filter processed and stored in the storage unit 34 (i.e. the average number of the weight values stored in the storage unit 34) for each of the weighing hoppers 5-1~14, when the combination weighing is performed. The selection head number is acquired as the average of the number of the weighing hoppers 5 selected by the combination calculating unit 35g described below in the combination weighing.

(2-7-5-6) Selecting Unit

The selecting unit 35f selects one of the multistage digital filters DF1~5 based on the total error expected values E1~5.

More specifically, the selecting unit 35f selects one of the multistage digital filter DF1~5 which indicates the smallest total error expected value E1~5 as the multistage digital filter DF1~5 for actual use. The selection result is sent to the DSP 33. The DSP 33 executes filter processing only by using the selected multistage digital filter DF1~5. As a result, in the combination calculating unit 35g described below, the weighing signal filter processed by the DSP 33 by the multistage digital filter (any one of the DF1~5) selected by the selecting unit 35f is used to perform the combination calculation.

(2-7-5-7) Combination Calculating Unit

The combination calculating unit 35g uses a combination weighing program stored in the storage unit 34 to perform a combination calculation based on the weight value (weighing value) of articles stored for each weighing hopper 5-1~14 in the storage unit 34 so that the total of the weight values coincides with the predetermined combination target weight (range). The result of the combination calculation is used to select a plurality of weighing hoppers 5-1~14. The information regarding the weighing hoppers 5-1~14 selected in the combination is sent to the WH opening/closing unit 35i. The weight value data for the weighing hoppers 5-1~14 selected in the combination are reset in the storage unit 34 which stores the weight value data for the weighing hoppers 5-1~14.

(2-7-5-8) PH Opening and Closing Unit

The PH opening/closing unit 35h operates the stepping motors 40a-1~14 to open the PH gates 4a-1~14 of the pool hoppers 4-1~14 disposed above the weighing hoppers 5-1~14 when any of the weighing hoppers 5-1~14 are empty (i.e. when any of the weighing hoppers 5-1~14 discharges the articles to the collection chute 6). Thereafter, the stepping motors 40a-1~14 are operated again to close the PH gates 4a-1~14.

(2-7-5-9) WH Opening and Closing Unit

The WH opening/closing unit 35i operates the stepping motors 50a-1~14 to open the WH gates 5a-1~14 of the weighing hoppers 5-14~14 included in the selected combination upon receipt of combination information of the weighing hoppers 5-1~14 selected in the combination calculation from the combination calculating unit 35g. Thereafter, the stepping motor 50a-1~14s are operated again to close the WH gates 5a-1~14.

(3) Characteristics of Combination Weighing Apparatus (3-1)

The combination weighing device 1 according to the present embodiment includes the dispersion feeder 2, a plurality of the radial feeders 3-1~44, and a plurality of the weighing hoppers 5-1~14. The dispersion feeder 2 is disposed on the upper portion of the combination weighing device 1 and conveys and disperses supplied articles. The radial feeders 3-1~14 are arranged radially on the periphery of the dispersion feeder 2, and are configured to convey the articles discharged from the dispersion feeder 2. The weighing hoppers 5-1-44 receive articles discharged from the radial feeders 3-1~44. The combination weighing device 1 performs the combination weighing based on the weight of the articles in the weighing hoppers 5-1~14. In the combination weighing device 1, selection of the multistage digital filter DF1~5 can be automatically performed as the operating setting.

In this manner, operating settings for the combination weighing device 1 can be performed in a short period without depending on the ability of operators.

(3-2)

The combination weighing device 1 according to the present embodiment has a plurality of the load cells 20-1~44 that acts as weighing units, a plurality of the multistage digital filters DF1~5, the combination calculating unit 35g, the first calculating unit 35a, the derivation unit 35b, the second calculating unit 35c, the third calculating unit 35d, and the selecting unit 35f. The load cells 20-1~44 are provided respectively to the weighing hoppers 5-1~14, weigh the articles received by each of the weighing hoppers 5-1~14, and output the weighing signal as the weighing result. The multistage digital filters DF1~5 includes a plurality of the staged filters and perform filter processing of the weighing signal by using the staged filter of the stage number that corresponds to the time after the weighing hoppers 5-1~44 receive the articles. The combination calculating unit 35g selects the combination of the weighing hoppers 5-1~44 based on the combination calculation using the weighing signal and performs the combination weighing. The first calculating unit 35a calculates the first to the Nth available filter processing times Tf1~N by using the operating speed. The derivation unit 35b compares the first to the Nth available filter processing times Tf1~N with the required processing time for each staged filter, and derives the stage number of the staged filter that will finish the filter processing before the end of the first to the Nth available filter processing times Tf1~N as the available stage number of processing for each of the multistage digital filters DF1~5. The second calculating unit 35c calculates an individual error expected values e1~5 respectively for the load cells 20-1~14 for each of the multistage digital filters DF1~5 based on the available stage number of processing, the selection head number that is the number of weighing hoppers 5-1~14 selected in the combination calculation, the stable head number that is the number of selectable weighing hoppers 5-1~14 in the combination calculation, and the error information for the respective staged filters. The third calculating unit 35d calculates the total error expected values E1~5 with respect to the total weight of articles after the combination weighing for each of the multistage digital filters DF1~5 based on the individual error expected values e1~5. The selecting unit 35f selects one of the multistage digital filters based on the total error expected values E1~5. The combination calculating unit 35g performs the combination calculation using the weighing signal to which filter processing is performed by the multistage digital filter selected by the selecting unit 35f.

In this manner, in relation to a given multistage digital filter DF1~5, the evaluation of the multistage digital filter DF1~0.5 at a given operating speed can be easily performed. As a result, it is possible to comprehend whether or not there are multistage digital filters DF1~0.5 that satisfies the error standard expected by a user at the operating speed. Furthermore, it is possible to easily compare the multistage digital filters DF1~5 for a plurality of multistage digital filters DF1~5. Then, combination weighing with the optimal selected multistage digital filter can be realized since one of the multistage digital filters is selected as the operating setting based on the total error expected values E1~5.

(3-3)

Furthermore, the combination weighing device 1 according to the present embodiment has the acquisition unit 35e configured to acquire the selection head number and the stable head number during operation.

In this context, more accurate total error expected values E1~5 can be calculated since the total error expected value E1~5 is calculated based on the measured stable head number and selection head number. That is to say, the multistage digital filters can be more accurately evaluated.

It is preferred that the acquisition unit 35e acquires both the selection head number and the stable head number. However even when only one of the selection head number or the stable head number is acquired, accurate total error expected values E1~5 can be easily calculated.

(3-4)

The combination weighing device 1 according to the present embodiment has the touch panel 110 configured to output the total error expected values E1~5.

In this manner, a user can directly comprehend the quantitative evaluation of the multistage digital filters DF1~5. The optimal multistage digital filter DF1~5 can be selected from a plurality of the multistage digital filters DF1~5. Furthermore, the user can easily comprehend the conditions of combination weighing which satisfy the error standard required by the user.

(3-5)

In addition, the combination weighing device 1 according to the present embodiment has further a plurality of the pool hoppers 4-1~14. The pool hoppers 4-1~14 are provided to the respective weighing hoppers 5-1~14, stores the articles supplied (discharged) from the radial feeders 3-1~14 temporary, and supply the articles to the weighing hoppers 5-1~14. The first calculating unit 35a calculates the first to the Nth available filter processing times Tf1-N based on the operating speed, the delay time Twp from opening of weighing hoppers 5-1~14 to opening of the pool hopper 4-1~14, and the stabilizing time Ts from opening of the pool hoppers 4-1~44 to starting of acquisition of the weighing signal by the load cells 20-1~14.

In this manner, even when the delay time or stabilizing time changes due to the change of the type of articles or the change of the amount of the articles supplied to the weighing hoppers 5, or the like changes, the first to the Nth available filter processing times Tf1~N corresponding to those conditions can be calculated. As a result, an accurate evaluation of the multistage digital filters DF1~5 can be performed.

(3-6)

The combination weighing device 1 according to the present embodiment has the touch panel 110 configured to be input the operating speed.

In this manner, even when it is necessary to change the operating speed, the respective multistage digital filters DF1~5 can be easily evaluated. As a result, even when the operating speed changes, it is easy to operate the combination weighing device 1 more accurately with optimal operating settings.

(4) Modified Example

In the above description, an embodiment of the present invention is described, but is not limited to this embodiment, and another configuration may be adopted within a scope that does not depart from the spirit of the present invention.

A modified example of the second embodiment of the present invention will be described below.

(4-1) Modified Example 2A

In the combination weighing device 1 according to the above embodiment, the selecting unit 35f is configured to select the multistage digital filters DF1~5 that do not have a stage number of the staged filter that can be used in relation to the first available filter processing time Tf1. However it is no limited to this.

For example, the selecting unit 35f may be configured not to select multistage digital filters DF1~5 that do not have a stage number of the staged filter that can be used at the time during the first available filter processing time Tf1. Furthermore, calculation processing may be performed by the calculation processing unit 35 under a condition that only one combination weighing is actually performed in two cycles of the combination calculation (cycle time C×2).

(4-2) Modified Example 2B

Figure 14:
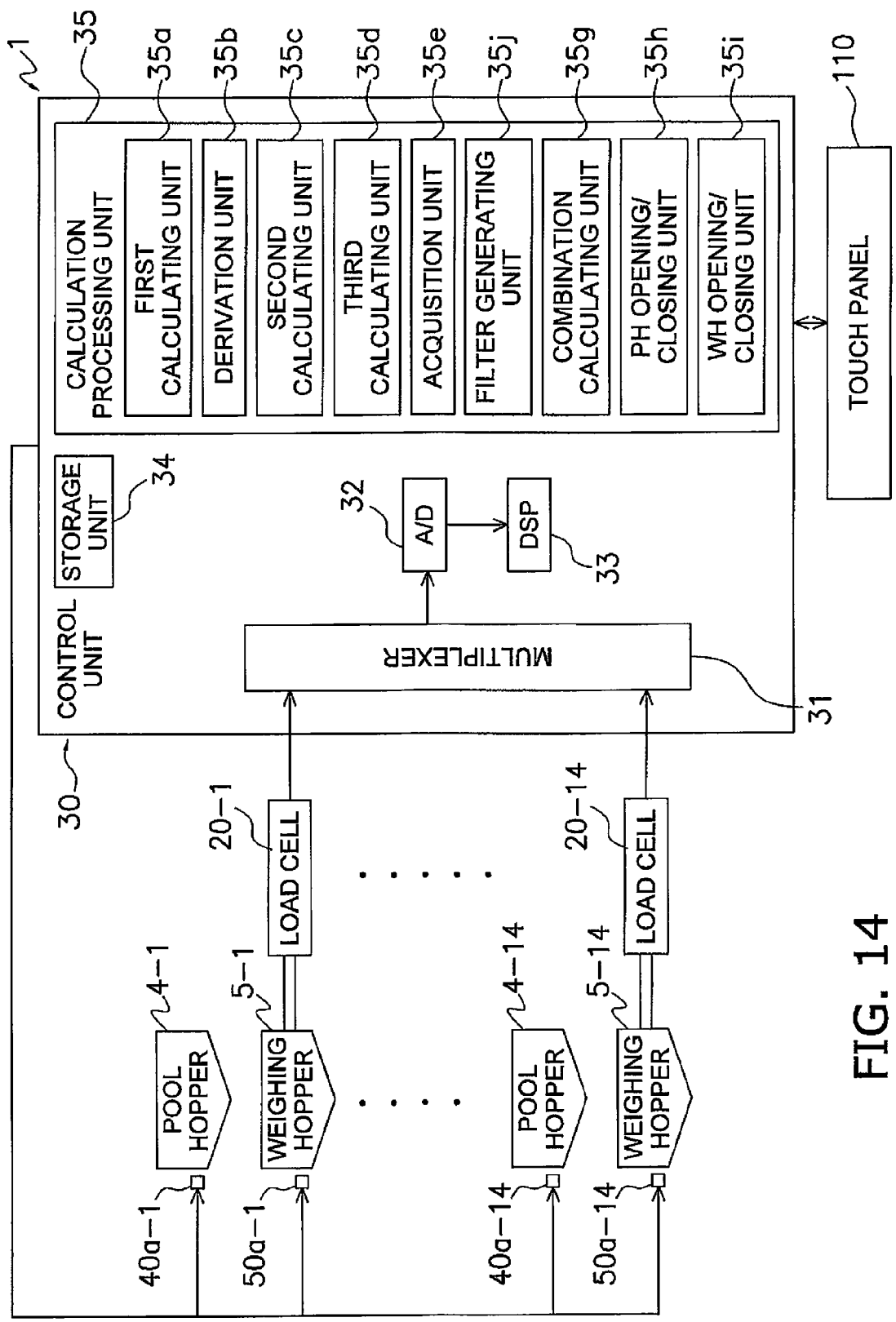
FIG. 14 is a block diagram illustrating the configuration of the combination weighing device according to a modified example 2B.

The selecting unit 35f of the combination weighing device 1 according to the above embodiment is configured to select one of the multistage digital filters DF1~5 based on the total error expected values E1~5, but it is no limited to this, and a filter generating unit 35j may be provided in substitution for the selecting unit 35f (reference is made to FIG. 14).

The first calculating unit 35a calculates the available filter processing time at a time of combination weighting in relation to a plurality of cycles by using the operating speed. That is to say, the first calculating unit 35a uses the operating speed to calculate the first to the Nth available filter processing times Tf1~N. The derivation unit 35b derives the available stage numbers of processing for each of the cycles, that is to say, for each of the first to the Nth available filter processing times Tf1~N. The second calculating unit 35c calculates the individual error expected values e1~5 for each cycle. The third calculating unit 35d calculates the total error expected values E1~5 for each cycle based on the individual error expected values e1~5 for each cycle. The filter generating unit 35j combines the staged filters for each cycle based on the total error expected values E1~5 for each cycle and thereby generates a filter. The combination calculating unit 35g performs a combination calculation using the weighing signal to which filter processing is performed by the filter generated by the filter generating unit 35j.

The multistage digital filters DF1~5, as described above, have the property that the weighing error increases when the required processing time is reduced, and conversely, the required processing time increases when the weighing error is reduced. Accordingly, the multistage digital filters DF1~5 used in filter processing for each combination weighing cycle are suitably combined to generate a new filter, and the new filter realizes a short required processing time and small weighing error compared with the multistage digital filters DF1~5. As a result, combination weighing can be performed by use of a weighing signal to which constantly optimal filter processing is applied.

For example, when it is assumed that a multistage digital filter that has a long required processing time is used, and a cycle may occurs in which there is no available stage number of processing, or in which the number of weighing signals that are filter processed is small. In this regard, a filter is generated in which another multistage digital filter having a short required processing time is used in a cycle in which there is no available processing stages or in which the number of weighing signals that are filter processed is small, and the multistage digital filter having a long required processing time is used in the other cycles, and thereby the required processing time can be reduced while reducing the weighing error.

(4-3) Modified Example 2C

The selecting unit 35f of the combination weighing device 1 according to the above embodiment selects one multistage digital filter DF1~5 that has the smallest total error expected value E1~5, but it is no limited to this. For example, the selecting unit 35f may be configured to select the multistage digital filter DF1~5 in which the total error expected value E1~5 is less than a predetermined value and that enables adoption of the largest stable head number.

In this manner, it is possible to make the number of the combination for the combination calculation as large as possible. That is to say, it is possible to realize the combination weighing device 1 which can most suppresses the combination error (a state in which even when any of the weighing hoppers 5-1~14 are combined a combination target weight is not realized (a combination target weight does not fall within the target weight range)) within a range of error permissible by a user.

In substitution for the selecting unit 35f, the multistage digital filter DF1~5 that is most adapted to the needs of a user can be selected based on the total error expected values E1~5 that are output onto the touch panel 110.

(4-4) Modified Example 2D

Although the combination weighing device 1 according to the above embodiment does not have booster hoppers, booster hoppers may be provided.

(4-5) Modified Example 2E

As in the combination weighing device 100 according to the first embodiment, a load amount on the dispersion feeder 2, the drive parameters for the dispersion feeder 2, a load amount on all radial feeders 3-1~14 and the drive parameters for the radial feeders 3-1~14 during a stable supply state may be also calculated in the combination weighing device 1 according to the above embodiment. Furthermore each of the calculated drive parameters may be set as an initial value for each of the feeders 2, 3.

The invention claimed is:

1. A combination weighing device comprising:
a dispersion feeder configured to convey and disperse supplied articles;
a plurality of radial feeders arranged radially outward from and below an outer periphery of the dispersion feeder, the radial feeders being configured to receive and further convey the articles discharged from the dispersion feeder;
a plurality of weighing hoppers configured to receive the articles discharged from the radial feeders;
a setting unit configured to set a combination target weight and set initial parameters related to the articles;
a dispersion control system configured to adjust a driving parameter for the dispersion feeder so that a discharge amount on each discharge from the dispersion feeder to the radial feeders coincides with the combination target weight;
a radial control system configured to adjust a drive parameter for each of the radial feeders so that a discharge amount on each discharge from a plurality of the radial feeders selected in a combination coincides with the combination target weight; and
a first control unit configured to calculate the drive parameter for the dispersion feeder and the drive parameter for the radial feeders based on the initial parameters related to the articles which include at least layer thickness parameters related to an expected layer thickness of the articles on the dispersion feeder and an expected layer thickness of the articles on the radial feeders while being conveyed, and set each of the calculated drive parameters as an initial value for the respective one of the dispersion control system and the radial control-system.

2. The combination weighing device according to claim 1, wherein
the setting unit is further configured to set speed parameters regarding whether the articles are easy to convey or difficult to convey as one of the initial parameters related to the articles respectively for the dispersion feeder and the radial feeders.

3. The combination weighing device according to claim 1, wherein
each of the layer thickness parameter related to the expected layer thickness of the articles on the dispersion feeder and the layer thickness parameter related to the expected layer thickness of the articles on the radial feeders has a first layer thickness parameter when the expected layer thickness of the conveyed articles is large and a second layer thickness parameter when the expected layer thickness of the conveyed articles is small, and
the layer thickness parameter is specified as the first or the second layer thickness parameter by designating whether the expected layer thickness of the conveyed articles is large or small.

4. The combination weighing device according to claim 2, wherein
each of the speed parameter related to the dispersion feeder and the speed parameter related to the radial feeders has a first speed parameter when the articles that are easy to convey are conveyed and a second speed parameter when the articles that are difficult to convey are conveyed,
the speed parameter is specified as the first or the second speed parameter by designating whether the articles are easy to convey or difficult to convey.

5. The combination weighing device according to claim 1, further comprising:
a plurality of weighing units provided to respective ones of the weighing hoppers, each of the weighing units being configured to weigh the articles received by each of the weighing hoppers and output a weighing signal as a weighing result;
a plurality of multistage digital filters including a plurality of staged filters, and the multistage digital filter being configured to perform filter processing of the weighing signal by using the staged filter of a stage number that corresponds to a time after the weighing hopper receives the article;
a combination calculating unit configured to select a combination of the weighing hoppers based on a combination calculation using the weighing signal, and perform the combination weighing;
a first calculation unit configured to calculate an available filter processing time by using an operating speed;
a derivation unit configured to compare the available filter processing time with a required processing time for each of the staged filters, and derive the stage number of the staged filter that will finish the filter processing before an end of the available filter processing time as an available stage number of processing for each of the multistage digital filters;
a second calculating unit configured to calculate an individual error expected value respectively for the weighing units for each of the multistage digital filters based on the available stage number of processing, a selection head number that is a number of the weighing hoppers selected in the combination calculation, a stable head number that is a number of the weighing hoppers selectable in the combination calculation, and error information for the respective staged filters;
a third calculating unit configured to calculate a total error expected value with respect to the total weight of the articles after the combination weighing for each of the multistage digital filters based on the individual error expected values; and
a selecting unit configured to select one of the multistage digital filters based on the total error expected values, wherein
the combination calculating unit is further configured to perform the combination calculation using the weighing signal to which filter processing is performed by the multistage digital filter selected by the selecting unit.

6. The combination weighing device according to claim 1, further comprising:
a plurality of weighing units provided to respective ones of the weighing hoppers, each of the weighing units being configured to weigh the articles received by each of the weighing hoppers and output a weighing signal as a weighing result;
a plurality of multistage digital filters including a plurality of staged filters, and the plurality of multistage digital filter being configured to perform filter processing of the weighing signal by using the staged filter of a stage number that corresponds to a time after the weighing hopper receives the articles;

a combination calculating unit configured to select a combination of the weighing hoppers based on a combination calculation using the weighing signal, and perform the combination weighing;

a first calculation unit configured to calculate an available filter processing time at a time of the combination weighing in relation to a plurality of cycles by using the operating speed;

a derivation unit configured to compare the available filter processing time with a required processing time for each of the staged filters, and derive the stage number of the staged filter that will finish the filter processing before an end of the available filter processing time as an available stage number of processing for each of the multistage digital filters and for each of the cycles;

a second calculating unit configured to calculate an individual error expected value respectively for the weighing units for each of the multistage digital filters and for each of the cycles based on the available number stage of processing, a selection head number that is a number of weighing hoppers selected in the combination calculation, a stable head number that is a number of the weighing hoppers selectable in the combination calculation, and error information for the respective staged filters;

a third calculating unit configured to calculate a total error expected value with respect to the total weight Of the articles after the combination weighing for each of the multistage digital filters and each of the cycles based on the individual error expected values; and a filter generating unit configured to combine the staged filters for each of the cycles based on the total error expected values and thereby generating a filter;

wherein the combination calculating unit is further configured to perform the combination calculation using the weighing signal to which filter processing is performed by the filter generated by the filter generating unit.

7. The combination weighing device according to claim 5, further comprising an acquisition unit acquiring at least one of the selection head number and the stable head number during operation.

8. The combination weighing device according to claim 5, further comprising an output unit outputting the total error expected value.

9. The combination weighing device according to claim 5, further comprising a plurality of pool hoppers provided to the respective weighing hoppers, the pool hoppers configured to store the articles discharged from the radial feeders temporarily and supply the articles to the weighing hoppers, wherein the first calculating unit is configure to calculate the available filter processing time based on the operating speed, a delay time from opening of the weighing hopper to opening of the pool hopper, and a stabilizing time from opening of the pool hopper to starting of the acquisition of the weighing signal by the weighing unit.

10. The combination weighing device according to claim 5, further comprising an input unit to be input the operating speed.

11. The combination weighing device according to claim 2, wherein each of the layer thickness parameter related to the expected layer thickness of the articles on the dispersion feeder and the layer thickness parameter related to the expected layer thickness of the articles on the radial feeders has a first layer thickness parameter when the expected layer thickness of the conveyed articles is large and a second layer thickness parameter when the expected layer thickness of the conveyed articles is small, and the layer thickness parameter is specified as the first or the second layer thickness parameter by designating whether the expected layer thickness of the conveyed articles is large or small.

12. The combination weighing device according to claim 2, further comprising:

a plurality of weighing units provided to respective ones of the weighing hoppers, each of the weighing units being configured to weigh the articles received by each of the weighing hoppers and output a weighing signal as a weighing result;

a plurality of multistage digital filters including a plurality of staged filters, and the multistage digital filter being configured to perform filter processing of the weighing signal by using the staged filter of a stage number that corresponds to a time after the weighing hopper receives the article;

a combination calculating unit configured to select a combination of the weighing hoppers based on a combination calculation using the weighing signal, and perform the combination weighing;

a first calculation unit configured to calculate an available filter processing time by using an operating speed;

a derivation unit configured to compare the available filter processing time with a required processing time for each of the staged filters, and derive the stage number of the staged filter that will finish the filter processing before an end of the available filter processing time as an available stage number of processing for each of the multistage digital filters;

a second calculating unit configured to calculate an individual error expected value respectively for the weighing units for each of the multistage digital filters based on the available stage number of processing, a selection head number that is a number of the weighing hoppers selected in the combination calculation, a stable head number that is a number of the weighing hoppers selectable in the combination calculation, and error information for the respective staged filters;

a third calculating unit configured to calculate a total error expected value with respect to the total weight of the articles after the combination weighing for each of the multistage digital filters based on the individual error expected values; and a selecting unit configured to select one of the multistage digital filters based on the total error expected values, wherein the combination calculating unit is further configured to perform the combination calculation using the weighing signal to which filter processing is performed by the multistage digital filter selected by the selecting unit.

13. The combination weighing device according to claim 2, further comprising:

a plurality of weighing units provided to respective ones of the weighing hoppers, each of the weighing units being configured to weigh the articles received by each of the weighing hoppers and output a weighing signal as a weighing result;

a plurality of multistage digital filters including a plurality of staged filters, and the plurality of multistage digital filter being configured to perform filter processing of the weighing signal by using the staged filter of a stage number that corresponds to a time after the weighing hopper receives the articles;

a combination calculating unit configured to select a combination of the weighing hoppers based on a combination calculation using the weighing signal, and perform the combination weighing;

a first calculation unit configured to calculate an available filter processing time at a time of the combination weighing in relation to a plurality of cycles by using the operating speed;

a derivation unit configured to compare the available filter processing time with a required processing time for each of the staged filters, and derive the stage number of the staged filter that will finish the filter processing before an end of the available filter processing time as an available stage number of processing for each of the multistage digital filters and for each of the cycles;

a second calculating unit configured to calculate an individual error expected value respectively for the weighing units for each of the multistage digital filters and for each of the cycles based on the available number stage of processing, a selection head number that is a number of weighing hoppers selected in the combination calculation, a stable head number that is a number of the weighing hoppers selectable in the combination calculation, and error information for the respective staged filters;

a third calculating unit configured to calculate a total error expected value with respect to the total weight of the articles after the combination weighing for each of the multistage digital filters and each of the cycles based on the individual error expected values; and a filter generating unit configured to combine the staged filters for each of the cycles based on the total error expected values and thereby generating a filter;

wherein the combination calculating unit is further configured to perform the combination calculation using the weighing signal to which filter processing is performed by the filter generated by the filter generating unit.

14. The combination weighing device according to claim 6, further comprising
an acquisition unit acquiring at least one of the selection head number and the stable head number during operation.

15. The combination weighing device according to claim 6, further comprising
an output unit outputting the total error expected value.

16. The combination weighing device according to claim 6, further comprising
a plurality of pool hoppers provided to the respective weighing hoppers, the pool hoppers configured to store the articles discharged from the radial feeders temporarily and supply the articles to the weighing hoppers, wherein
the first calculating unit is configure to calculate the available filter processing time based on the operating speed, a delay time from opening of the weighing hopper to opening of the pool hopper, and a stabilizing time from opening of the pool hopper to starting of the acquisition of the weighing signal by the weighing unit.

17. The combination weighing device according to claim 6, further comprising
an input unit to be input the operating speed.

18. The combination weighing device according to claim 1, wherein
(1) in an initial setting mode, the first control unit is configured to calculate the drive parameter for the dispersion feeder and the drive parameter for the radial feeders based on the initial parameters related to the articles and set each of the calculated drive parameters as the initial value for the respective one of the dispersion control system and the radial control system, and
(2) in an operation mode, the first control unit is further configured to adjust the drive parameters for the dispersion feeder and the drive parameter for the radial feeders automatically.

19. The combination weighing device according to claim 18, wherein
the initial setting mode is executed at a startup.

* * * * *